(12) United States Patent
Suyama et al.

(10) Patent No.: US 12,145,693 B2
(45) Date of Patent: Nov. 19, 2024

(54) BICYCLE DERAILLEUR

(71) Applicant: Shimano Inc., Osaka (JP)

(72) Inventors: Shota Suyama, Osaka (JP); Atsuhiro Emura, Osaka (JP); Dai Yokozawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/946,618

(22) Filed: Sep. 16, 2022

(65) Prior Publication Data

US 2024/0092458 A1   Mar. 21, 2024

(51) Int. Cl.
*B62M 9/1242* (2010.01)
*B62M 9/124* (2010.01)
*B62M 9/1244* (2010.01)
*B62M 9/126* (2010.01)

(52) U.S. Cl.
CPC ........ *B62M 9/1242* (2013.01); *B62M 9/1244* (2013.01); *B62M 9/126* (2013.01); *B62M 2009/12406* (2013.01)

(58) Field of Classification Search
CPC .... B62M 9/1242; B62M 9/126; B62M 9/125; B62M 9/122; B62M 9/124; B62M 9/16; B62M 9/121; B62M 2009/12406; B62M 9/1244; B62M 9/1248
USPC .................................................. 474/82, 80
See application file for complete search history.

(56) References Cited

U.S. PATENT DOCUMENTS

| | | | | |
|---|---|---|---|---|
| 6,394,921 B1 * | 5/2002 | Fukuda | ............. | B62M 9/126 474/82 |
| 7,722,488 B2 * | 5/2010 | Kunisawa | ............. | B62M 9/121 474/82 |
| 7,871,346 B2 * | 1/2011 | Takachi | ............. | B62M 9/1248 474/82 |
| 7,955,205 B2 * | 6/2011 | Urabe | ............. | B62M 9/16 474/80 |
| 8,678,964 B2 * | 3/2014 | Lin | ............. | B62M 9/124 474/80 |
| 9,039,551 B2 * | 5/2015 | Bohm | ............. | B62M 9/1244 474/82 |

(Continued)

FOREIGN PATENT DOCUMENTS

| | | | | |
|---|---|---|---|---|
| CN | 203727600 U | * | 7/2014 | ............. B62M 9/124 |
| DE | 102021214742 A1 | * | 7/2022 | ............. B62M 9/1248 |

*Primary Examiner* — Michael R Mansen
*Assistant Examiner* — Raveen J Dias
(74) *Attorney, Agent, or Firm* — Global IP Counselors, LLP

(57) ABSTRACT

A bicycle derailleur includes a base member, a movable member, a link member, a chain guide, a biasing mechanism and a switching member. The link member movably couples the movable member to the base member. The chain guide is pivotally coupled to the movable member about a pivot axis. The biasing mechanism is operatively disposed between the movable member and the chain guide, and biases the chain guide with respect to the movable member about the pivot axis in a first direction in a biasing state. The switching member is configured to selectively switch the biasing mechanism between the biasing state and a releasing state. The biasing mechanism biases the chain guide less in the releasing state than the biasing state. The switching member is disengaged from the biasing mechanism in the biasing state. The switching member is engaged with the biasing mechanism in the releasing state.

17 Claims, 30 Drawing Sheets

(56) References Cited

U.S. PATENT DOCUMENTS

| | | | | |
|---|---|---|---|---|
| 9,056,651 | B2* | 6/2015 | Tetsuka | B62M 25/08 |
| 9,377,089 | B2* | 6/2016 | Yamaguchi | B62M 9/126 |
| 9,475,547 | B2* | 10/2016 | Jordan | B62M 9/1248 |
| 9,751,590 | B2* | 9/2017 | Shipman | B62M 9/1248 |
| 10,094,450 | B2* | 10/2018 | Simmons | F16H 7/0831 |
| 10,351,208 | B2* | 7/2019 | Yamaguchi | B62M 9/1244 |
| 10,486,769 | B2* | 11/2019 | Bernardele | B62M 9/1244 |
| 10,703,443 | B2* | 7/2020 | Schuster | B62M 9/12 |
| 10,759,494 | B2* | 9/2020 | Shipman | B62M 9/1248 |
| 11,001,339 | B2* | 5/2021 | Liao | B62M 9/124 |
| 11,098,787 | B2* | 8/2021 | Ziegler | F16F 15/1292 |
| 11,230,350 | B2* | 1/2022 | Braedt | B62M 9/121 |
| 11,407,476 | B2* | 8/2022 | Yoshida | B62M 9/1248 |
| 11,459,062 | B2* | 10/2022 | Fukumori | B62M 6/45 |
| 11,577,803 | B2* | 2/2023 | Kamada | B62M 9/122 |
| 11,661,141 | B2* | 5/2023 | Fujimoto | B62M 9/126 474/80 |
| 11,780,532 | B2* | 10/2023 | Braedt | B62M 9/122 474/80 |
| 2005/0215368 | A1* | 9/2005 | Hoe | B62M 9/126 474/80 |
| 2006/0240920 | A1* | 10/2006 | Urabe | B62M 9/16 474/80 |
| 2008/0125259 | A1* | 5/2008 | Kunisawa | B62M 9/126 474/82 |
| 2009/0247334 | A1* | 10/2009 | Takachi | B62M 9/126 474/82 |
| 2013/0130853 | A1* | 5/2013 | Bohm | B62M 9/124 474/80 |
| 2013/0203532 | A1* | 8/2013 | Jordan | B62M 9/1248 474/82 |
| 2013/0281237 | A1* | 10/2013 | Lin | B62M 9/124 474/80 |
| 2013/0303317 | A1* | 11/2013 | Yamaguchi | B62M 9/126 474/80 |
| 2014/0058578 | A1* | 2/2014 | Tetsuka | B62M 9/132 701/1 |
| 2015/0072816 | A1* | 3/2015 | Yamaguchi | B62M 9/16 474/113 |
| 2016/0046352 | A1* | 2/2016 | Shipman | B62M 9/128 29/428 |
| 2016/0176478 | A1* | 6/2016 | Chang | B62M 9/126 474/69 |
| 2016/0304160 | A9* | 10/2016 | Chang | B62M 9/121 |
| 2017/0283004 | A1* | 10/2017 | Calendrille | B62M 9/121 |
| 2017/0327183 | A1* | 11/2017 | Shipman | B62M 9/1248 |
| 2018/0244345 | A1* | 8/2018 | Yamaguchi | B62M 9/122 |
| 2018/0265169 | A1* | 9/2018 | Braedt | B62M 9/128 |
| 2018/0346058 | A1* | 12/2018 | Brown | B62M 9/126 |
| 2018/0370598 | A1* | 12/2018 | Chang | B62M 9/126 |
| 2019/0144072 | A1* | 5/2019 | Su | B62M 9/127 474/82 |
| 2019/0248447 | A1* | 8/2019 | Takachi | B62M 9/121 |
| 2019/0322333 | A1* | 10/2019 | Braedt | B62M 9/121 |
| 2019/0329841 | A1* | 10/2019 | Shipman | B62M 9/124 |
| 2020/0062344 | A1* | 2/2020 | Liao | B62M 9/1242 |
| 2021/0070394 | A1* | 3/2021 | Fukumori | B62M 6/45 |
| 2021/0070395 | A1* | 3/2021 | Braedt | B62M 9/126 |
| 2021/0155316 | A1* | 5/2021 | Fujimoto | B62M 9/1246 |
| 2021/0155317 | A1* | 5/2021 | Kamada | B62M 9/1248 |
| 2021/0155318 | A1* | 5/2021 | Yoshida | B62M 9/1248 |
| 2022/0063763 | A1* | 3/2022 | Braedt | B62M 9/122 |
| 2023/0106097 | A1* | 4/2023 | Braedt | B62K 25/02 474/82 |
| 2023/0406448 | A1* | 12/2023 | Braedt | B62M 9/125 |

* cited by examiner

BICYCLE DERAILLEUR

BACKGROUND

Technical Field

This disclosure generally relates to a bicycle derailleur.

Background Information

Generally, a bicycle typically uses a bicycle drive train for transmitting a pedaling force to a rear wheel. The drive train of a bicycle often uses one or two bicycle derailleurs to selectively move a bicycle chain from one of a plurality of sprockets to another for changing speeds of the bicycle. Typically, a bicycle derailleur includes a base member, a movable member, a link member and a chain guide. The base member is configured to be mounted to a frame of the bicycle. The movable member is movably coupled to the base member by the link member. The chain guide is coupled to the movable member. The chain guide shifts a chain between a pair of sprockets in response to the movement of the base member relative to the base member to perform a shifting operation. The bicycle derailleur can be controlled manually by a hand operated actuator that is connected to the derailleur by a mechanical cable, or by a motor unit to perform the shifting operation.

SUMMARY

Generally, the present disclosure is directed to various features of a bicycle derailleur.

In view of the state of the known technology and in accordance with a first aspect of the present disclosure, a bicycle derailleur is provided that basically comprises a base member, a movable member, a link member, a chain guide, a biasing mechanism and a switching member. The link member movably couples the movable member to the base member. The chain guide is pivotally coupled to the movable member about a pivot axis. The biasing mechanism is operatively disposed between the movable member and the chain guide, and biases the chain guide with respect to the movable member about the pivot axis in a first direction in a biasing state. The switching member is configured to selectively switch the biasing mechanism between the biasing state and a releasing state. The biasing mechanism biases the chain guide less in the releasing state than the biasing state. The switching member is disengaged from the biasing mechanism in the biasing state. The switching member is engaged with the biasing mechanism in the releasing state.

With the bicycle derailleur according to the first aspect, a chain can be easily detached from the bicycle derailleur.

In accordance with a second aspect of the present disclosure, the bicycle derailleur according to the first aspect is configured so that the switching member is movably coupled to the movable member between an engaging position to establish the releasing state and a disengaging position to establish the biasing state.

With the bicycle derailleur according to the second aspect, the switching member can be easily moved between an engaging position to establish the releasing state and a disengaging position to establish the biasing state.

In accordance with a third aspect of the present disclosure, the bicycle derailleur according to the second aspect is configured so that the switching member is biased towards the disengaging position.

With the bicycle derailleur according to the third aspect, the switching member can be easily set and maintained in the disengaging position.

In accordance with a fourth aspect of the present disclosure, the bicycle derailleur according to the second aspect or the third aspect is configured so that the switching member includes a pin movably coupled to the movable member along a center axis of the pin.

With the bicycle derailleur according to the fourth aspect, the switching member can be conveniently operated without increasing the overall size of the bicycle derailleur.

In accordance with a fifth aspect of the present disclosure, the bicycle derailleur according to the fourth aspect is configured so that the switching member includes a biasing element biasing the pin towards the disengaging position.

With the bicycle derailleur according to the fifth aspect, the switching member can be easily maintained in the disengaging position using a biasing element.

In accordance with a sixth aspect of the present disclosure, the bicycle derailleur according to the fourth aspect or the fifth aspect is configured so that the center axis of the pin is parallel to the pivot axis of the chain guide.

With the bicycle derailleur according to the sixth aspect, the switching member can be conveniently operated without increasing the overall size of the bicycle derailleur.

In accordance with a seventh aspect of the present disclosure, the bicycle derailleur according to any one of the fourth aspect to the sixth aspect is configured so that the chain guide includes at least one pulley having a rotational axis spaced from the pivot axis of the chain guide. The center axis of the pin is disposed radially inward of the rotational axis of the at least one pulley in a radial direction of the pivot axis of the chain guide.

With the bicycle derailleur according to the seventh aspect, the chain can be reliably guided and/or tensioned using at least one pulley, and the pin of the switching member can be easily operated.

In accordance with an eighth aspect of the present disclosure, the bicycle derailleur according to any one of the fourth aspect to the seventh aspect is configured so that the pin is movably disposed in an axial direction of a through hole of the movable member.

With the bicycle derailleur according to the eighth aspect, the pin of the switching member can be reliably moved in the axial direction of the pin.

In accordance with a ninth aspect of the present disclosure, the bicycle derailleur according to any one of the first aspect to the eighth aspect is configured so that the biasing mechanism includes a biasing member and an intermediate member. The biasing member transmits a torque to the intermediate member. The intermediate member is configured to transmit the torque of the biasing member to the chain guide in the biasing state.

With the bicycle derailleur according to the ninth aspect, the switching member can reliably transmit the torque of the biasing member via the intermediate member to the chain guide in the biasing state.

In accordance with a tenth aspect of the present disclosure, the bicycle derailleur according to the ninth aspect is configured so that the intermediate member is located between the movable member and the chain guide.

With the bicycle derailleur according to the tenth aspect, the intermediate member can be easily and reliably transmit the torque of the biasing member to the chain guide in the biasing state.

In accordance with an eleventh aspect of the present disclosure, the bicycle derailleur according to the ninth aspect or the tenth aspect is configured so that the intermediate member is configured to move with respect to the movable member between a first position and a second position. The switching member is configured to be engaged with the intermediate member at the second position.

With the bicycle derailleur according to the eleventh aspect, the switching member can reliably maintain the chain guide in the releasing state using the intermediate member.

In accordance with a twelfth aspect of the present disclosure, the bicycle derailleur according to the eleventh aspect is configured so that the second position of the intermediate member is located upstream of the first position of the intermediate member with respect to the first direction.

With the bicycle derailleur according to the twelfth aspect, the releasing state can reliably obtained such that little or no torque is transmitted from the biasing member to the chain guide in the releasing state.

In accordance with a thirteenth aspect of the present disclosure, the bicycle derailleur according to any one of the ninth aspect to the twelfth aspect is configured so that the intermediate member is pivotally disposed around the pivot axis of the chain guide.

With the bicycle derailleur according to the thirteenth aspect, the intermediate member can be relative easily mounted between the movable member and the chain guide without the need of addition parts.

In accordance with a fourteenth aspect of the present disclosure, the bicycle derailleur according to any one of the ninth aspect to the thirteenth aspect is configured so that the intermediate member includes a biasing portion and a first engaging portion. The biasing portion is configured to contact the chain guide to bias the chain guide in the first direction. The first engaging portion is configured to engage with the switching member in a state where the biasing member is in the releasing state.

With the bicycle derailleur according to the fourteenth aspect, the intermediate member can be reliably transmit the torque of the biasing member to the chain guide in the biasing state, and reliably disengage the torque of the biasing member from being transmitted to the chain guide in the releasing state.

In accordance with a fifteenth aspect of the present disclosure, the bicycle derailleur according to the fourteenth aspect is configured so that the first engaging portion is offset from the biasing portion with respect to an axial direction of the pivot axis of the chain guide.

With the bicycle derailleur according to the fifteenth aspect, the switching member can be conveniently located relative to the intermediate member and the chain guide without increasing the overall size of the bicycle derailleur.

In accordance with a sixteenth aspect of the present disclosure, the bicycle derailleur according to the fourteenth aspect or the fifteenth aspect is configured so that the switching member includes a second engaging portion that is engaged with the first engaging portion in a state where the biasing mechanism is in the releasing state.

With the bicycle derailleur according to the sixteenth aspect, the switching member can reliably engage the intermediate member in the releasing state.

In accordance with a seventeenth aspect of the present disclosure, the bicycle derailleur according to any one of the ninth aspect to the sixteenth aspect is configured so that the intermediate member is configured to move against the torque of the biasing member to the second position by moving the chain guide in a second direction opposite to the first direction.

With the bicycle derailleur according to the seventeenth aspect, the intermediate member can be easily moved to the second position by the user moving the chain guide so that the intermediate member can be set to the second position by the switching member.

In accordance with an eighteenth aspect of the present disclosure, the bicycle derailleur according to any one of the ninth aspect to the seventeenth aspect is configured so that the chain guide is free from the torque of the biasing member in the releasing state.

With the bicycle derailleur according to the eighteenth aspect, a chain can be easily detached from the bicycle derailleur.

In accordance with a nineteenth aspect of the present disclosure, a bicycle derailleur is provided that basically comprises a base member, a movable member, a link member, a chain guide, a biasing member, an intermediate member and a switching member. The link member movably couples the movable member to the base member. The chain guide is pivotally coupled to the movable member about a pivot axis. The biasing member is operatively disposed between the movable member and the chain guide, and biases the chain guide with respect to the movable member about the pivot axis in a first direction in a biasing state. The intermediate member is movably coupled to the movable member. The intermediate member includes a biasing portion and a first engaging portion. The biasing portion contacts the chain guide to transmit a torque of the biasing member to the chain guide in the biasing state. The switching member is movably coupled to the movable member between an engaging position and a disengaging position. The switching member includes a second engaging portion engaged with the first engaging portion of the intermediate member to prevent the torque of the biasing member to be transmitted to the chain guide in the engaging position. The second engaging portion is disengaged from the first engaging portion of the intermediate member in the disengaging position to permit torque of the biasing member to be transmitted to the chain guide in the disengaging position.

With the bicycle derailleur according to the nineteenth aspect, a chain can be easily detached from the bicycle derailleur.

Also, other objects, features, aspects and advantages of the disclosed bicycle derailleur will become apparent to those skilled in the art from the following detailed description, which, taken in conjunction with the annexed drawings, discloses preferred embodiments of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
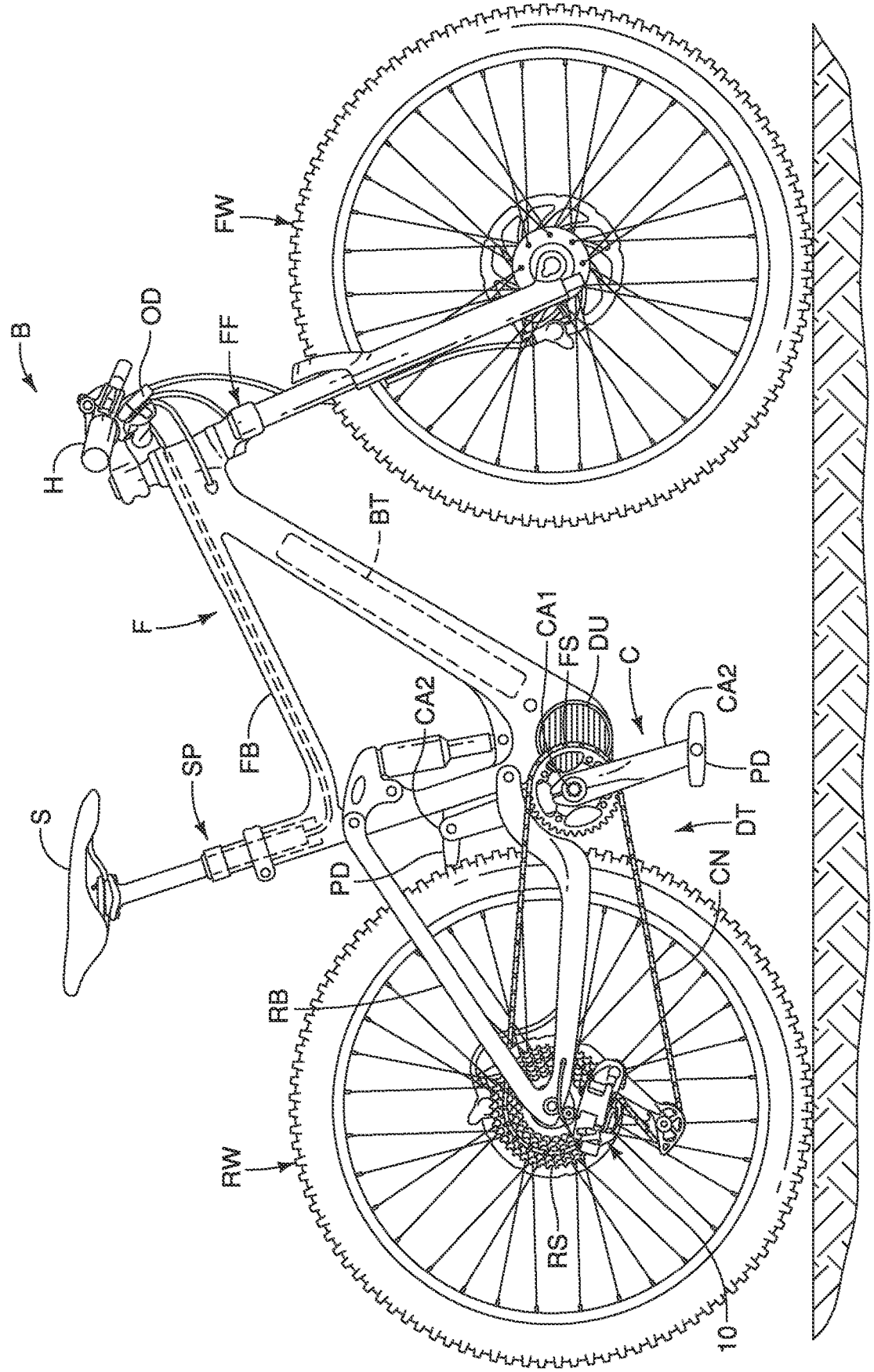
FIG. 1 is a side elevational view of a bicycle that is equipped with a rear derailleur a bicycle derailleur (i.e., a rear bicycle derailleur) in accordance with a first embodiment of the present disclosure.

Referring initially to FIG. 1, a bicycle B is illustrated that is equipped with a bicycle derailleur 10 in accordance with one illustrative embodiment. Here, the bicycle B is illustrated as an electric assist bike. However, the bicycle derailleur 10 can be applied to any other type of bicycles such as, for example, a mountain bike, a cyclocross bicycle, a road bicycle, a city bike, a cargo bike, and a recumbent bike.

As shown in FIG. 1, the bicycle B includes a bicycle frame F that is supported by a rear wheel RW and a front wheel FW. The bicycle frame F basically includes a front frame body FB and a rear frame body RB (a swing arm). The bicycle frame F is also provided with a front fork FF and a handlebar H for steering the bicycle B. The bicycle B further includes an adjustable seatpost SP coupled to the seat tube of the bicycle frame F for support a bicycle seat S at the upper end.

The bicycle B further includes a drivetrain DT. Here, for example, the drivetrain DT is a chain-drive type that includes a crank C, a plurality of front sprockets FS, a plurality of rear sprockets RS and a chain CN. The crank C includes a crank axle CA1 and a pair of crank arms CA2. The crank axle CA1 is rotatably supported to the front frame body FB. The crank arms CA2 are provided on opposite ends of the crank axle CAL A pedal PD is rotatably coupled to the distal end of each of the crank arms CA2. The front sprocket FS is provided on the crank C to rotate integrally with the crank axle CAL The rear sprockets RS are provided on a hub of the rear wheel RW. The chain CN runs around the front sprocket FS and the rear sprockets RS. A human driving force is applied to the pedals PD by a rider of the bicycle B such that the driving force is transmitted via the front sprocket FS, the chain CN and the rear sprockets RS to the rear wheel RW. While the drivetrain DT is illustrated as a chain-drive type of drivetrain, the drivetrain DT can be selected from any type of drivetrain, and can be a belt-drive type or a shaft-drive type. Here, the bicycle B further includes a drive unit DU that is configured to apply a propulsion force to the crank axle CA1 of the bicycle B.

In the illustrated embodiment, the bicycle derailleur 10 is an electric rear derailleur. The bicycle derailleur 10 is configured to the chain CN between the rear sprockets RS in response to either an automatic shift signal from a cycle computer, or a user inputted shift signal from an operating device OD such as an electric shift lever. A power supply BT is provided to the bicycle frame F for supplying electric power to the bicycle derailleur 10. For example, the power supply BT can be electrically connected with an electrical cable to the bicycle derailleur 10 for supplying electrical power thereto. Here, the power supply BT is provided inside a downtube of the bicycle frame F. Alternatively, the power supply BT can be provided to the bicycle derailleur 10 or to another portion of the bicycle frame F.

Figure 2:
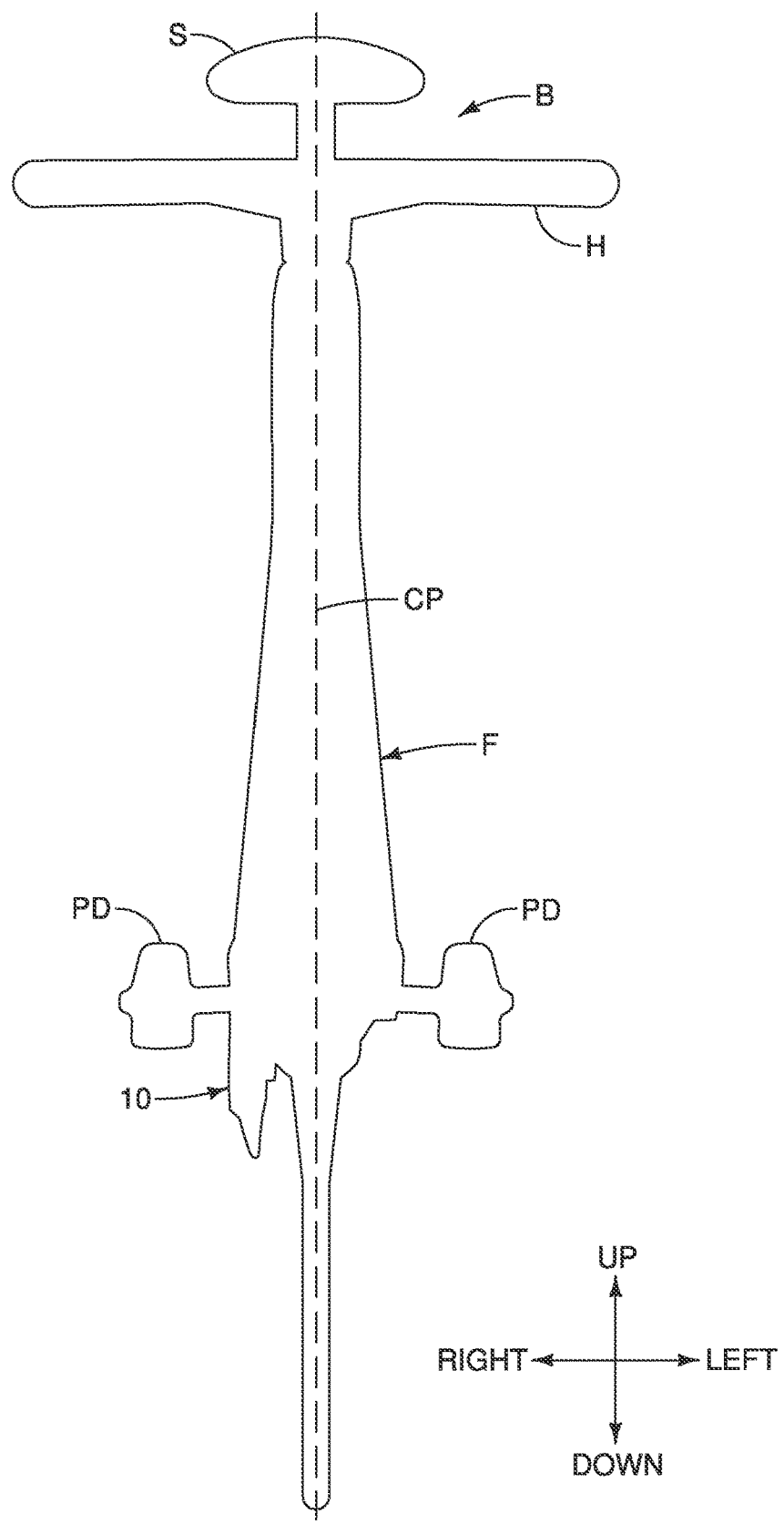
FIG. 2 is an outline of the bicycle equipped with the rear bicycle derailleur illustrated in FIG. 1 as viewed from in front of the bicycle and along a longitudinal direction to show a bicycle center plane vertically bisecting the frame of the bicycle.

Referring to FIG. 2, an outline of the bicycle B is illustrated as viewed from in front of the bicycle B and along a longitudinal direction to show a bicycle center plane CP vertically bisecting a frame F of the bicycle B. The bicycle center plane CP passes through a center of the bicycle frame F in a width direction of the bicycle frame F. The bicycle center plane CP separates a left side from a right side of the bicycle B. The following directional terms "front," "rear," "forward," "rearward," "left," "right," "lateral," "longitudinal", "upward," and "downward," as well as any other similar directional terms, refer to those directions which are determined on the basis of a rider sitting upright on the seat S of the bicycle B while facing the handlebar H of the bicycle B.

Figure 3:
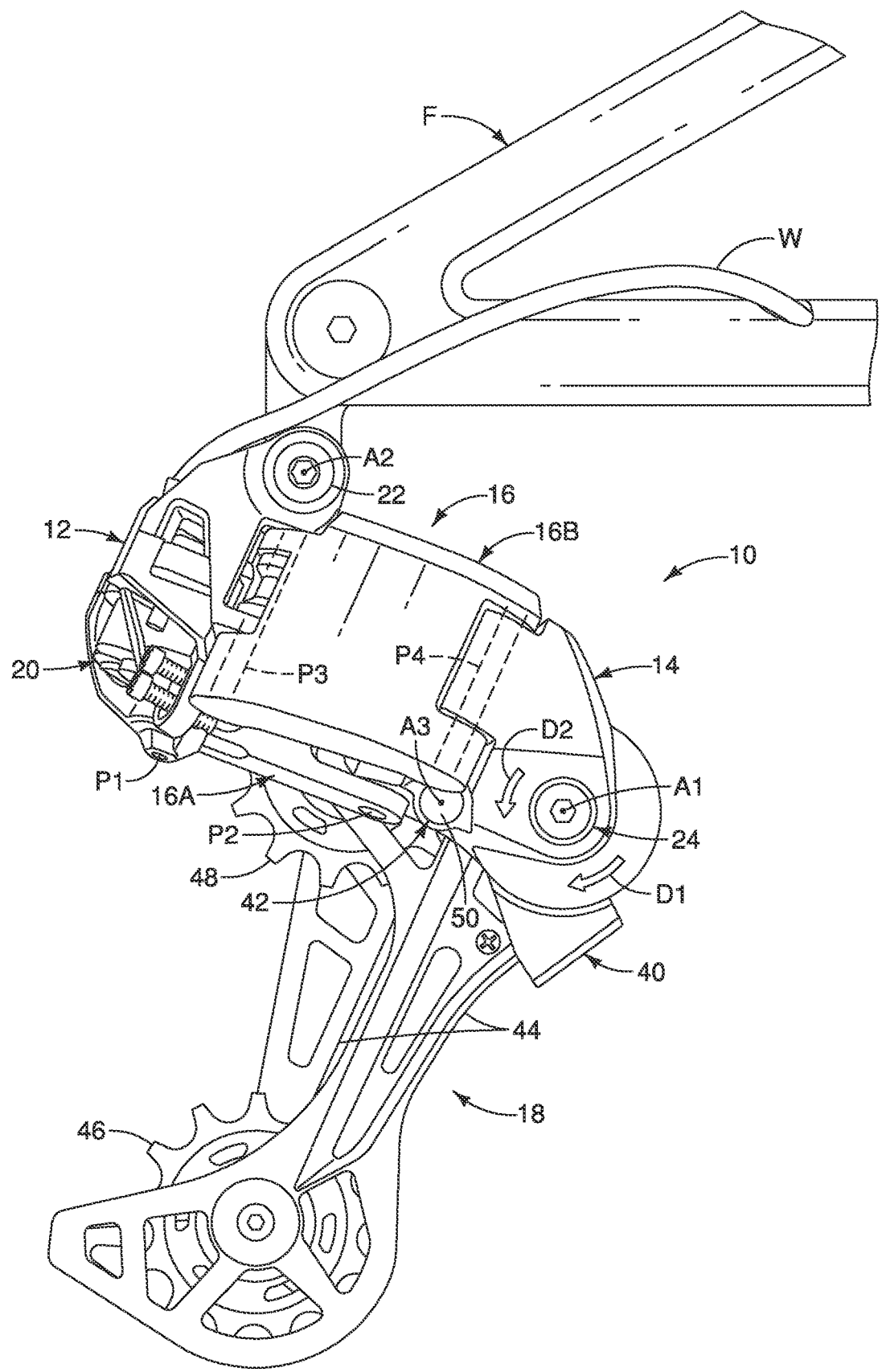
FIG. 3 is an outer side elevational view of the rear bicycle derailleur coupled to the bicycle frame illustrated in FIG. 1.
Figure 4:
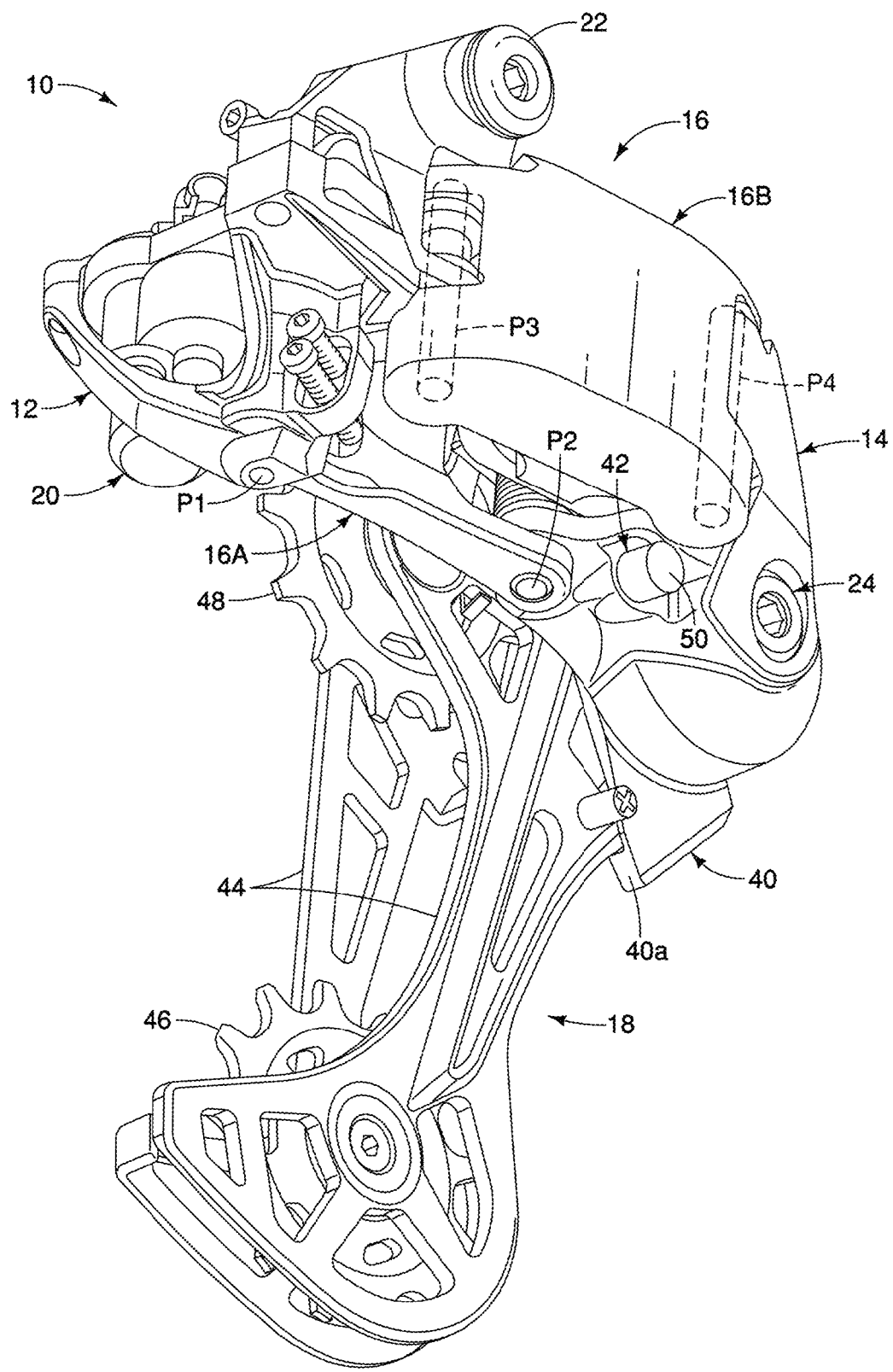
FIG. 4 is an outer side perspective view of the rear bicycle derailleur illustrated in FIG. 3.
Figure 5:
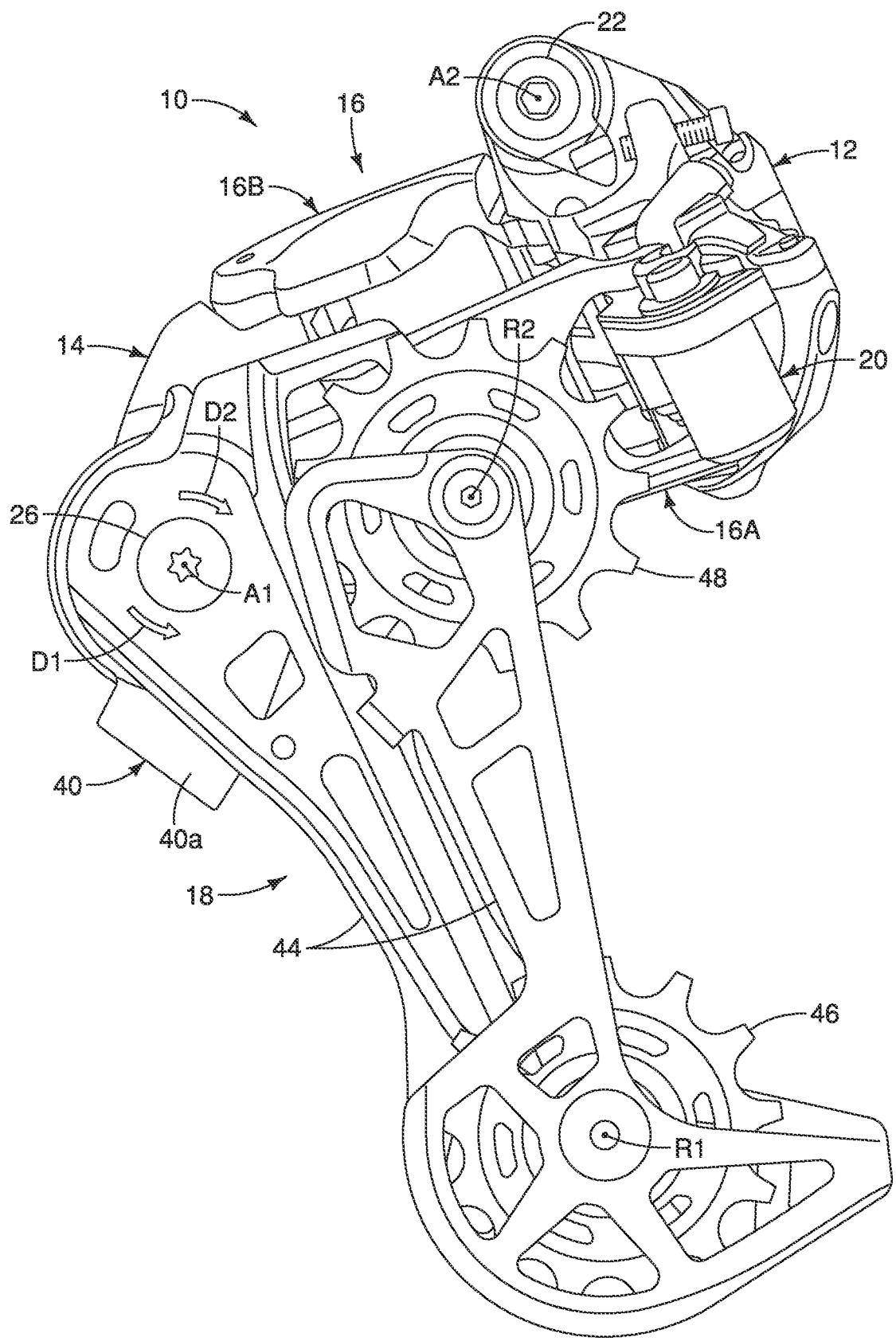
FIG. 5 is an inner side elevational view of the rear bicycle derailleur illustrated in FIGS. 3 and 4.

Referring now to FIGS. 3 to 5, the bicycle derailleur 10 will be discussed herein in more detail. The bicycle derailleur 10 comprises a base member 12, a movable member 14, a link member 16 and a chain guide 18. The base member 12 is configured to be attached to the frame F of the bicycle B. The movable member 14 is movable relative to the base member 12. Specifically, the link member 16 movably couples the movable member 14 to the base member 12. The chain guide 18 is pivotally coupled to the movable member 14 about a pivot axis A1.

As mentioned above, in the illustrated embodiment, the bicycle derailleur 10 is an electric rear derailleur. Thus, here, the bicycle derailleur 10 further comprises an actuator 20. The power supply BT is configured to supply electric power to the actuator 20 via the electrical cable W. The actuator 20 is configured to move the movable member 14 relative to the base member 12 in response to a shifting operation. The shifting operation can be a manual shifting operation in which the operating device OD or some other operating device is operated to generate a shift signal that is transmitted to the actuator 20 to operate the bicycle derailleur 10. The shifting operation can also be an automatic shifting operation in which a shift signal is generate by a controller based on one or more operating conditions of the bicycle B.

The actuator 20 can be any type of actuator as needed and/or desired. Thus, the actuator 20 is not limited to the actuator 20 illustrated herein. Furthermore, the actuator 20 can be omitted, and the movable member 14 can be moved relative to the base member 12 using a control cable such a Bowden cable. Basically, in the illustrated embodiment, the actuator 20 is an electrical actuator that receives shift commands either through wireless signals from the operating device OD, or through the electrical cable W. The electrical cable W can use either power line communication (PLC) or a dedicated signal wire to transmit the shift signals to the actuator 20. The operating device OD can communicate with the power supply BT using either wired communications or wireless communications. In the case of the actuator 20 of the illustrated embodiments, the actuator 20 houses a reversible electric motor, a gear reduction unit and an electronic controller.

Here, the actuator 20 is provided to the base member 12. The electric motor of the actuator 20 is operatively connected to the link member 16 via the gear reduction unit to move the movable member 14 relative to the base member 12. In other words, the electric motor of the actuator 20 is configured to apply a torque between the link member 16 and the base member 12 such that the link member 16 pivots relative to the base member 12.

As mentioned above, the base member 12 is configured to be mounted to the bicycle frame F. In particular, the base member 12 includes a frame mounting structure, such as a fixing bolt 22 that is configured to be attached to the bicycle frame F. Thus, the base member 12 is laterally stationary with respect to the bicycle frame F when the movable member 14 is moved to shift the bicycle chain CN. The base member 12 is preferably constructed of a rigid material such as a lightweight metal (e.g., an aluminum alloy or a fiber reinforced plastic). Preferably, the base member 12 is pivotally mounted on the fixing bolt 22 that defines a pivot axis A2. The pivot axis A2 is sometimes called the B-axis. The base member 12 can also include a pair of adjusting bolts that are configured to define an outermost position of the movable member 14 relative to the base member 12 and an innermost position of the movable member 14 relative to the base member 12. Preferably, the adjusting bolts are contactable to the link member 16.

As mentioned above, the link member 16 movably connects the movable member 14 to the base member 12. Specifically, the link member 16 is a linkage that includes a first link 16A and a second link 16B. The first link 16A and the second link 16B enable relative movement of the movable member 14 with respect to the base member 12 as the bicycle derailleur 10 shifts the chain CN in a lateral direction. As shown, the first link 16A is closer to the bicycle center plane CP than the second link 16B from the bicycle center plane CP in a state where the bicycle derailleur 10 is mounted to the bicycle frame F as seen in FIG. 1. In other words, the first link 16A is located inward of the second link 16B relative to the bicycle center plane CP in a state where the bicycle derailleur 10 is mounted to the bicycle frame F. On other hand, the second link 16B is located outward of the first link 16A relative to the bicycle center plane CP. Thus, here, the first link 16A can be considered an inner link because the first link 16A is closer to the bicycle center plane CP than the second link 16B. On the other hand, the second link 16B can be considered an outer link because the second link 16B is farther from the bicycle center plane CP than the first link 16A. Optionally, the actuator 20 can be arranged to at least one of the first link 16A, the second link 16B, the base member 12 and the movable member 14.

As seen in FIGS. 3 and 4, the first link 16A and the second link 16B operatively couple the movable member 14 to the base member 12 to enable relative movement of the movable member 14 with respect to the base member 12. The first link 16A and the second link 16B are pivotally connected to the base member 12 and the movable member 14. In the illustrated embodiment, for example, the first link 16A of the link member 16 is pivotally coupled to the base member 12 by a first link pin P1 and pivotally coupled to the movable member 14 by a second link pin P2. The second link 16B of the link member 16 is pivotally coupled to the base member 12 by a third link pin P3, and pivotally coupled to the movable member 14 by a fourth link pin P4. Here, the first link 16A and the second link 16B are pivotally connected to the base member 12 and the movable member 14 to define a four bar linkage arrangement. The linkage 16 preferably further includes a biasing member (e.g., a torsion spring) that is interposed between the first link 16A and the second link 16B to take up any play.

Figure 7:
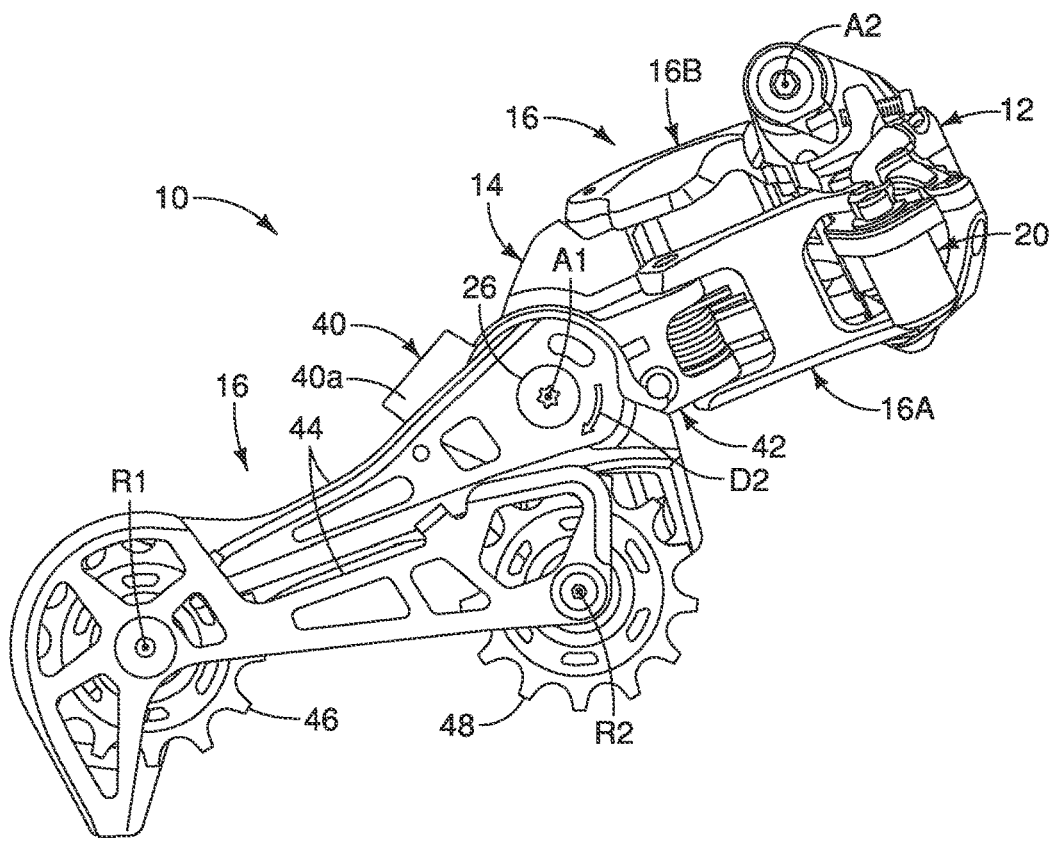
FIG. 7 is an inner side elevational view of the rear bicycle derailleur illustrated in FIGS. 3 to 6 in which the chain guide is held in a non-use position.

The movable member 14 is constructed of a suitable rigid material such as an aluminum alloy or a fiber reinforced plastic. Basically, the movable member 14 is movably arranged relative to the base member 12 to move between a retracted position and an extended position for shifting the chain CN. The movable member 14 is provided with the chain guide 18 for guiding and tensioning the chain CN. As mentioned above, the chain guide 18 is pivotally coupled to the movable member 14. In particular, the bicycle derailleur 10 further comprises a pivot shaft 24 that is coupled to the movable member 14 and the chain guide 18. Here, the pivot shaft 24 is fixedly coupled to the chain guide 18 and rotatably coupled to the movable member 14. Alternatively, the pivot shaft 24 can be fixedly coupled to movable member 14 and rotatably coupled to the chain guide 18. The pivot shaft 24 defines the pivot axis A1. In this way, the chain guide 18 is pivotally mounted to the movable member 14 by the pivot shaft 24 to pivot about the pivot axis A1, which is sometimes called the P-axis. Here, as seen in FIG. 7, the pivot shaft 24 is fixed to the chain guide 18 by a fixing bolt 26. In this way, the chain guide 18 and the pivot shaft 24 pivot together relative to the movable member 14. Thus, the pivot shaft 24 is pivotally mounted to the movable member 14.

Figure 10:
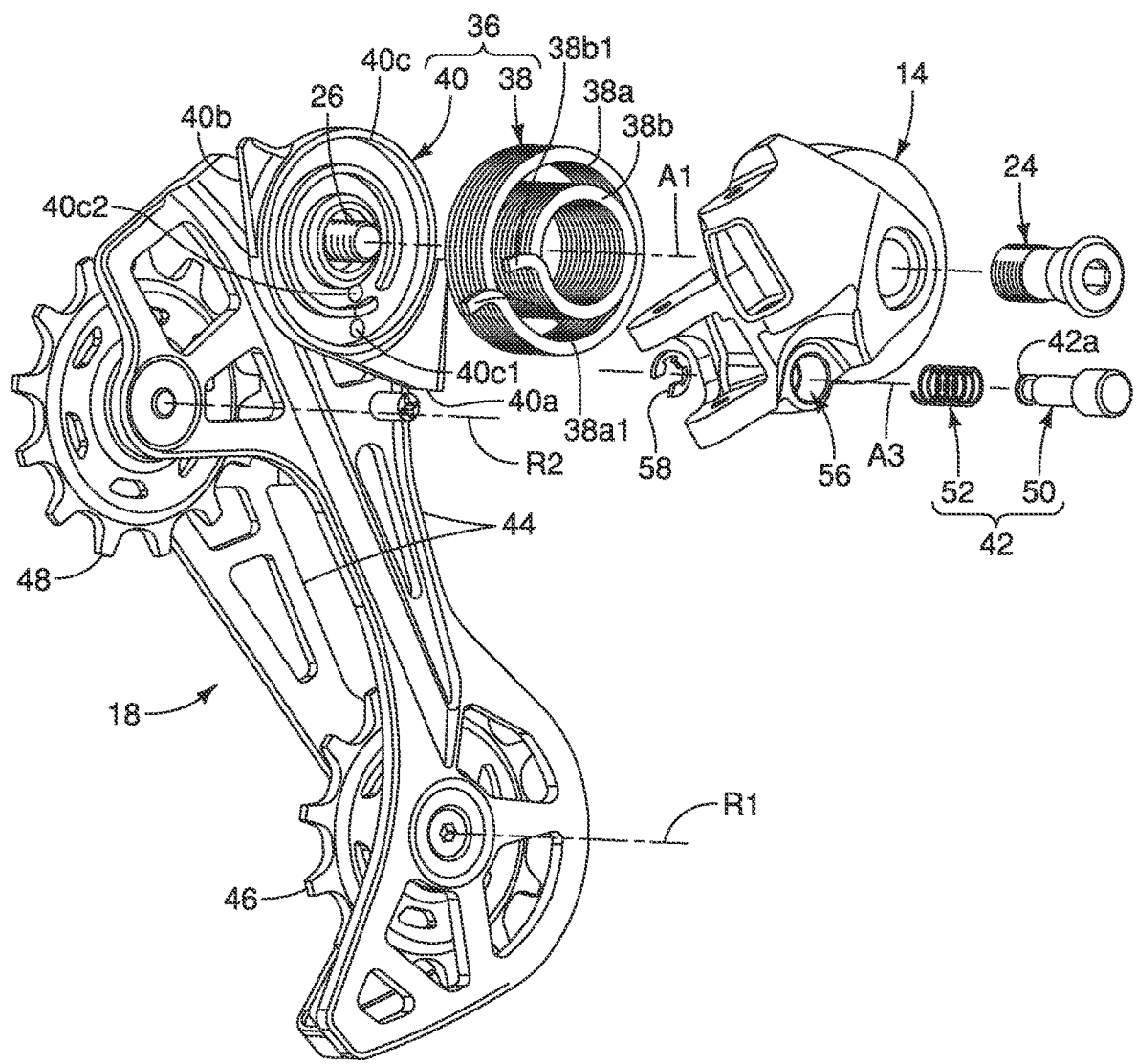
FIG. 10 is a partially exploded perspective view of a portion of the rear bicycle derailleur illustrated in FIGS. 3 to 8.

As seen in FIG. 10, the bicycle derailleur 10 further comprises a biasing mechanism 36. The biasing mechanism 36 is operatively disposed between the movable member 14 and the chain guide 18. The biasing mechanism 36 biases the chain guide 18 with respect to the movable member 14 about the pivot axis A1 in a first direction D1 in a biasing state. In the first embodiment, the bicycle derailleur 10 further comprises a biasing member 38 and an intermediate member 40 that form the biasing mechanism 36. In other words, the biasing mechanism 36 includes a biasing member 38 and an intermediate member 40. Basically, the biasing member 38 is operatively disposed between the movable member 14 and the intermediate member 40. In this way, the biasing member 38 applies a torque to the intermediate member 40 with respect to the movable member 14 to bias about the pivot axis A1 in the first direction D1 in a biasing state. Preferably, the biasing member 38 is preloaded such that the chain guide 18 in the first direction D1 in a state where the chain CN is disengaged from the chain guide 18 of the bicycle derailleur 10.

As seen in FIGS. 10 to 12 and 14, in the first embodiment, the biasing member 38 includes an outer biasing member 38a and an inner biasing member 38b. Here, the outer biasing member 38a is a first coiled torsion spring, and the inner biasing member 38b is a second coiled torsion spring. As seen in FIGS. 10 to 12 and 14, the outer biasing member 38a and the inner biasing member 38b are shown in unloaded states. Preferably, when the bicycle derailleur 10 is in an assembled state, the outer biasing member 38a and the inner biasing member 38b are preloaded to bias the chain guide 18 and the intermediate member 40 with respect to the movable member 14 about the pivot axis A1 in the first direction D1 in a biasing state. The outer biasing member 38a is larger in diameter than the inner biasing member 38b. Thus, the outer biasing member 38a is disposed around the inner biasing member 38b. In the first embodiment, the outer biasing member 38a is concentrically arranged around the inner biasing member 38b.

Figure 11:
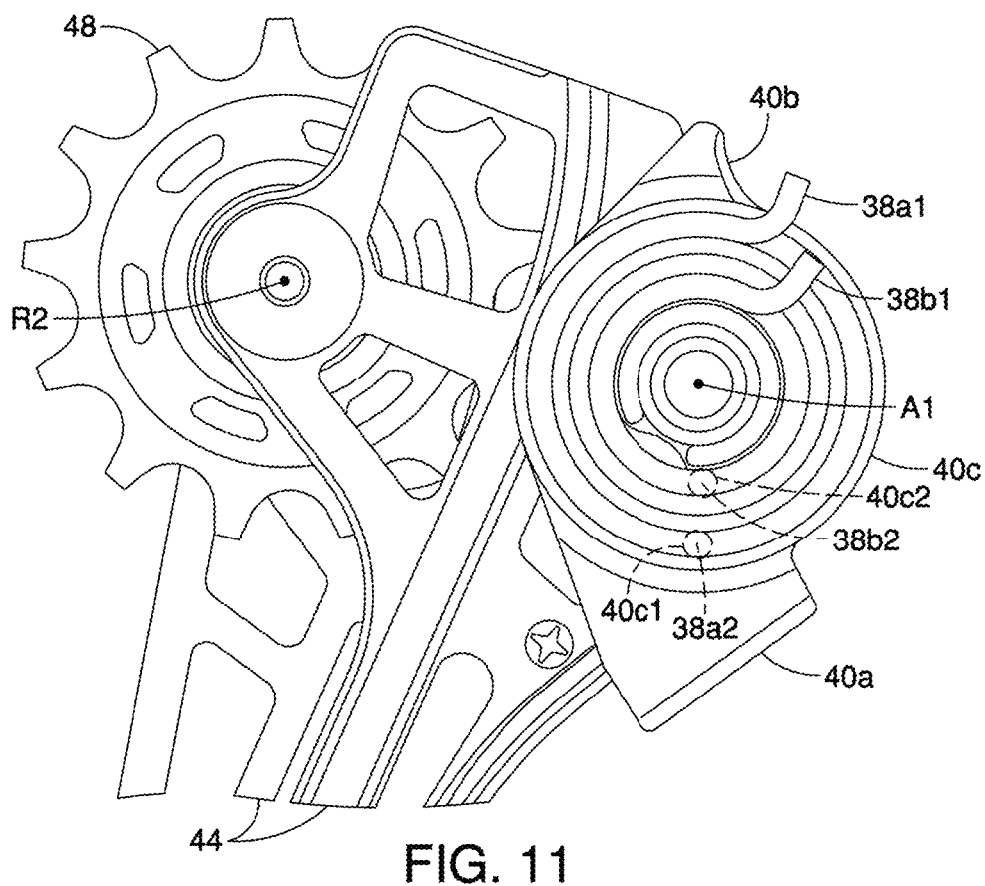
FIG. 11 is an inner side elevational view of a portion of the rear bicycle derailleur illustrated in FIGS. 3 to 8 in which the biasing member is coupled to the intermediate member in an unloaded state where a connecting portion of the biasing member is engaged with the intermediate member.
Figure 12:
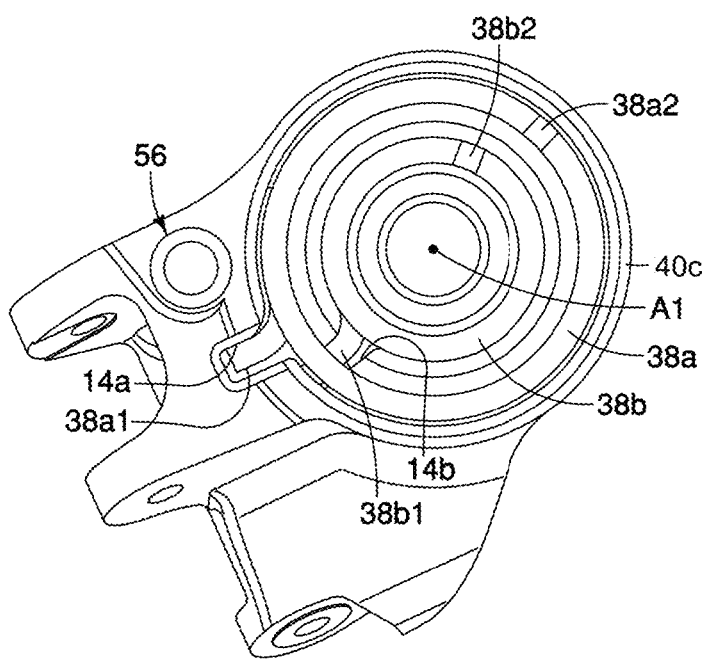
FIG. 12 is an outer side elevational view of the movable member and the biasing member of the rear bicycle derailleur illustrated in FIGS. 3 to 8 in which the biasing member is coupled to the movable member is in an unloaded state where end portions of the biasing member are engaged with the movable member.
Figure 13:
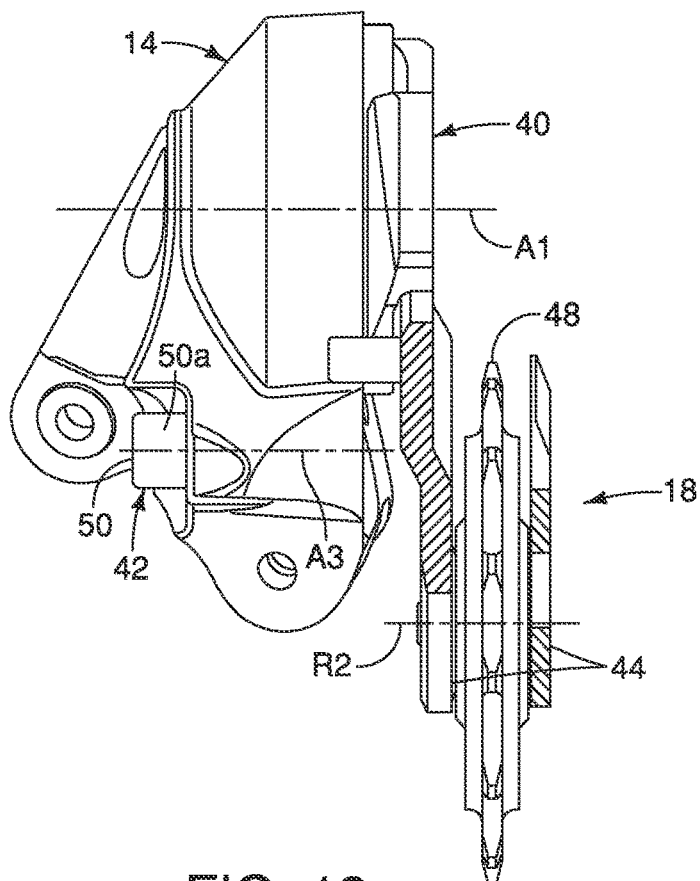
FIG. 13 is an oblique view of a portion of the rear bicycle derailleur illustrated in FIGS. 3 to 8 in which the switching member is in the disengaging position.

As seen in FIGS. 11 and 12, the outer biasing member 38a has a first end portion 38a1 and a second end portion 38a2. In the assembled state, the first end portion 38a1 of the outer biasing member 38a is engaged in a recess 14a of the movable member 14. In the assembled state, the second end portion 38a2 of the outer biasing member 38a is engaged in a hole or recess 40c1 of the intermediate member 40. Also, as seen in FIGS. 11 and 12, the inner biasing member 38b has a first end portion 38b1 and a second end portion 38b2. In the assembled state, the first end portion 38b1 of the inner biasing member 38b is engaged in a recess 14b of the movable member 14. In the assembled state, the second end portion 38b2 of the inner biasing member 38b is engaged in a hole or recess 40c2 of the intermediate member 40. The first end portion 38a1 of the outer biasing member 38a and the first end portion 38b1 of the inner biasing member 38b is located between the pivot shaft 24 and the link member 16 as viewed in direction parallel to the pivot axis A1.

While the second end portion 38a2 of the outer biasing member 38a is engaged with the intermediate member 40 using the recess 40c1 and the second end portion 38b2 of the inner biasing member 38b is engaged with the intermediate member 40 using the recess 40c2, the engagements of the second end portion 38a2 and the second end portion 38b2 with the intermediate member 40 are not limited to illustrated embodiment. Rather, other engagement methods of the second end portion 38*a*2 and the second end portion 38*b*2 with the intermediate member 40 can be used as needed and/or desired so long as the second end portion 38*a*2 and the second end portion 38*b*2 are engaged with intermediate member 40 so as to rotate with the intermediate member 40.

Figure 14:
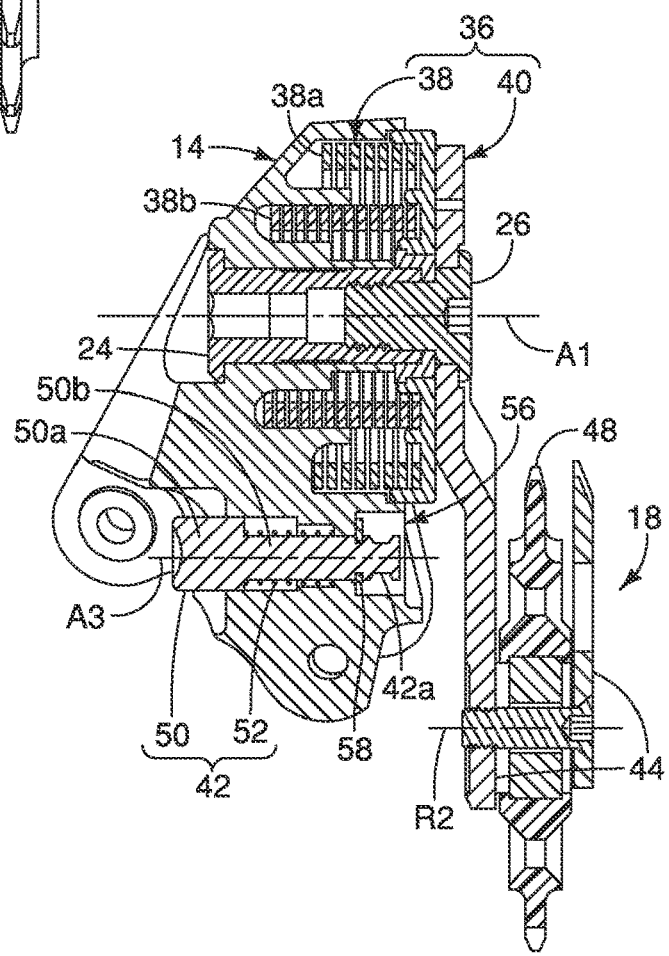
FIG. 14 is a cross sectional view of a portion of the rear bicycle derailleur illustrated in FIGS. 3 to 8 in which the switching member is in the disengaging position.

As seen in FIG. 14, the inner biasing member 38*b* is longer than the outer biasing member 38*a* in a direction of the pivot axis A1 of the pivot shaft 24. With this arrangement, the chain tension of the bicycle chain CN can be increased. As a result, a shift operation can be stable performed under a high load condition (e.g., a high torque applied to the bicycle chain CN by pedaling). Further with this arrangement, when under a high load condition, the increases tension in the bicycle chain CN suppresses the likelihood of the bicycle chain CN falling off of one of the rear sprockets RS. In particular, in high load state, the driving part of the bicycle chain CN may start to come off from the rear sprocket RS by moving the bicycle chain CN moves from a root of a tooth of the bicycle chain CN to a tip of the tooth. As a result of this situation occurring, the tension applied to the bicycle chain CN is increased by the outer biasing member 38*a* and the inner biasing member 38*b*, and thus, the tension of the driven part of bicycle chain CN is increased and the driving part of the bicycle chain CN can be returned to the tooth root side.

The difference between the weight of the outer biasing member 38*a* and the weight of the inner biasing member 38*b* can be equal to or less than 40%. Preferably, the difference between the weight of the outer biasing member 38*a* and the weight of the inner biasing member 38*b* can be equal to or less than 20%. More preferably, the weight of the outer biasing member 38*a* and the weight of the inner biasing member 38*b* are the same. In particular, by decreasing weight difference between the outer biasing member 38*a* and the inner biasing member 38*b*, the spring force difference between the outer biasing member 38*a* and the inner biasing member 38*b* can be suppressed.

The intermediate member 40 is located between the movable member 14 and the chain guide 18. The intermediate member 40 is movably coupled to the movable member 14. In particular, the intermediate member 40 is pivotally disposed around the pivot axis A1 of the chain guide 18. The intermediate member 40 is configured to move with respect to the movable member 14 between a first position and a second position. The second position of the intermediate member 40 is located upstream of the first position of the intermediate member 40 with respect to the first direction D1. The intermediate member 40 is configured to move against the torque of the biasing member 38 to the second position by moving the chain guide 18 in a second direction D2 that is opposite to the first direction D1.

In other words, the biasing member 38 transmits a torque to the intermediate member 40, and the intermediate member 40 is configured to transmit the torque of the biasing member 38 to the chain guide 18 in the biasing state. Thus, the biasing member 38 is operatively disposed between the movable member 14 and the chain guide 18, and the biasing member 38 biases the chain guide 18 with respect to the movable member 14 about the pivot axis A1 in the first direction D1 in the biasing state.

Figure 6:
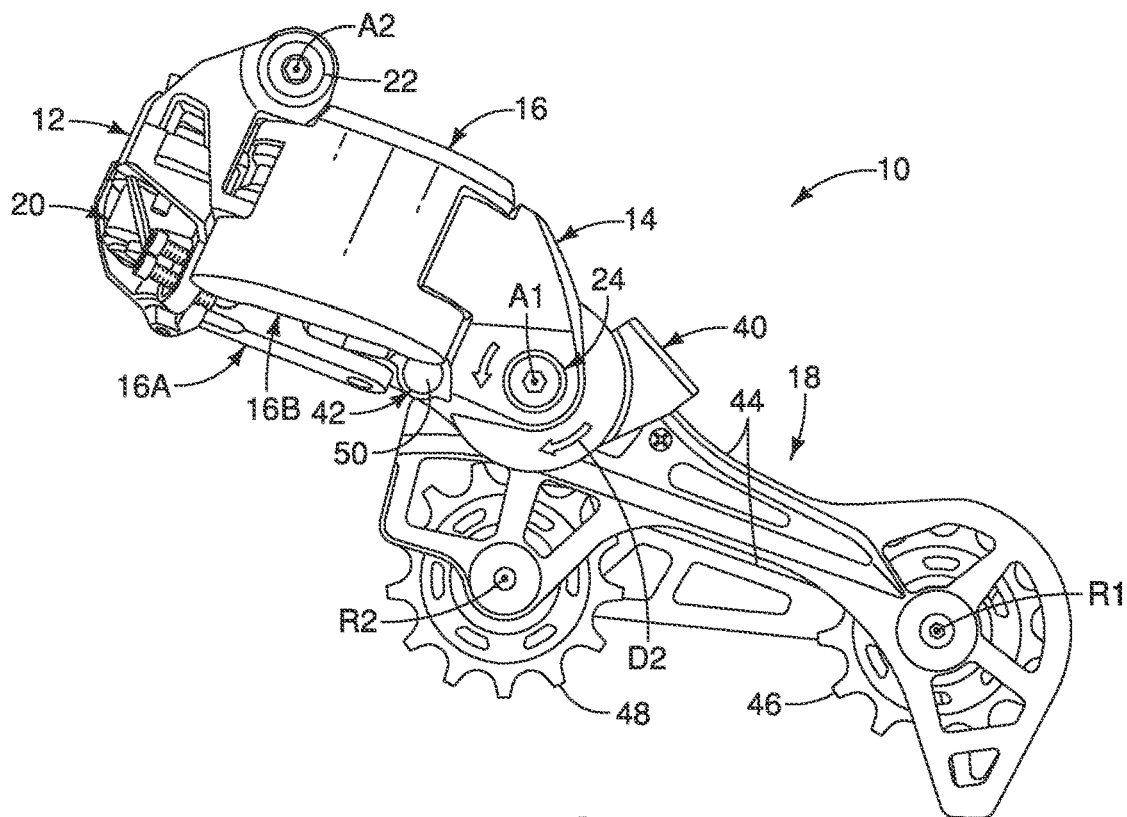
FIG. 6 is an outer side elevational view of the rear bicycle derailleur illustrated in FIGS. 3 to 5 in which the chain guide is held in a non-use position.
Figure 8:
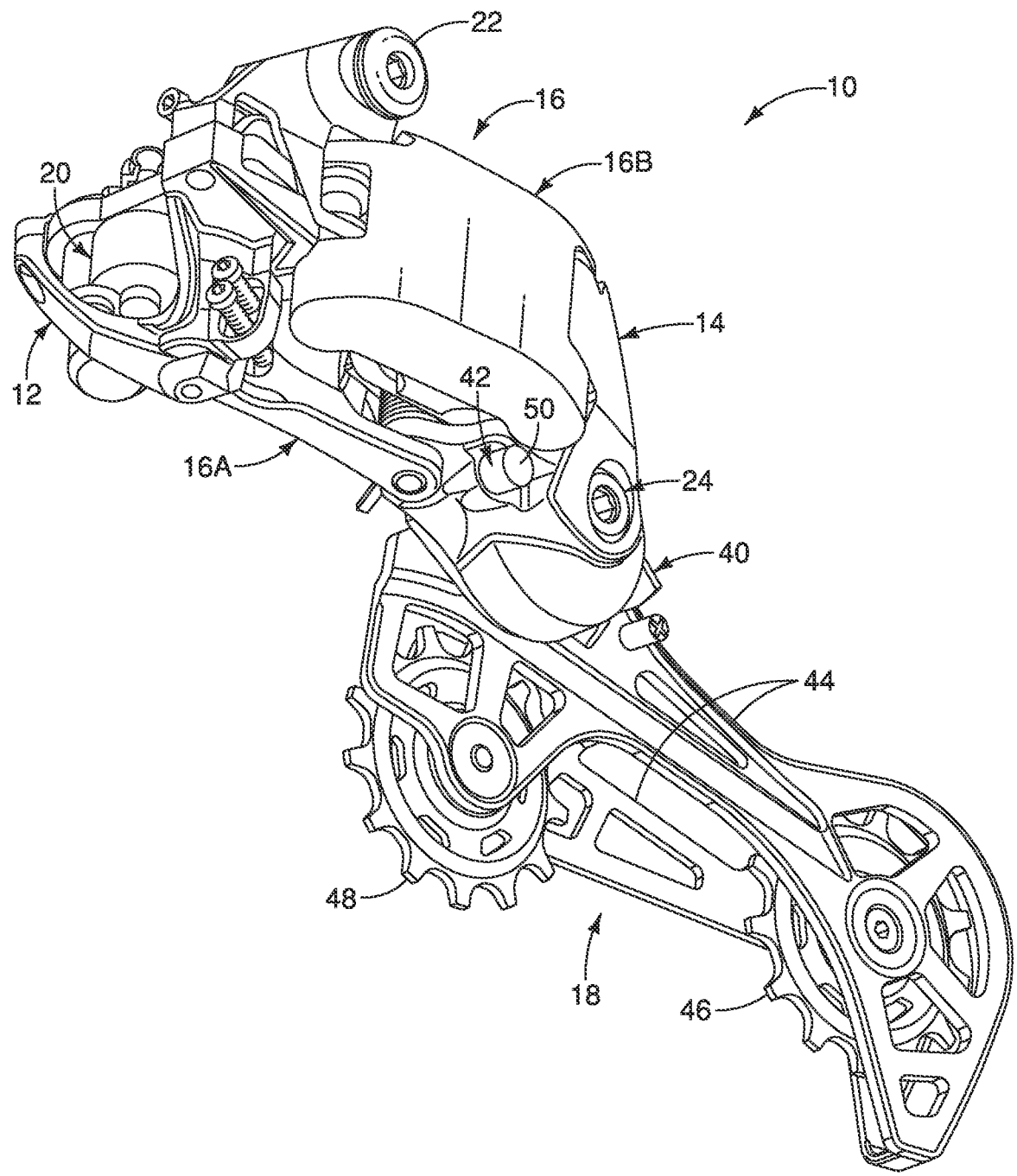
FIG. 8 is an outer side perspective view of the rear bicycle derailleur illustrated in FIGS. 3 to 7 in which the chain guide is held in a non-use position.
Figure 9:
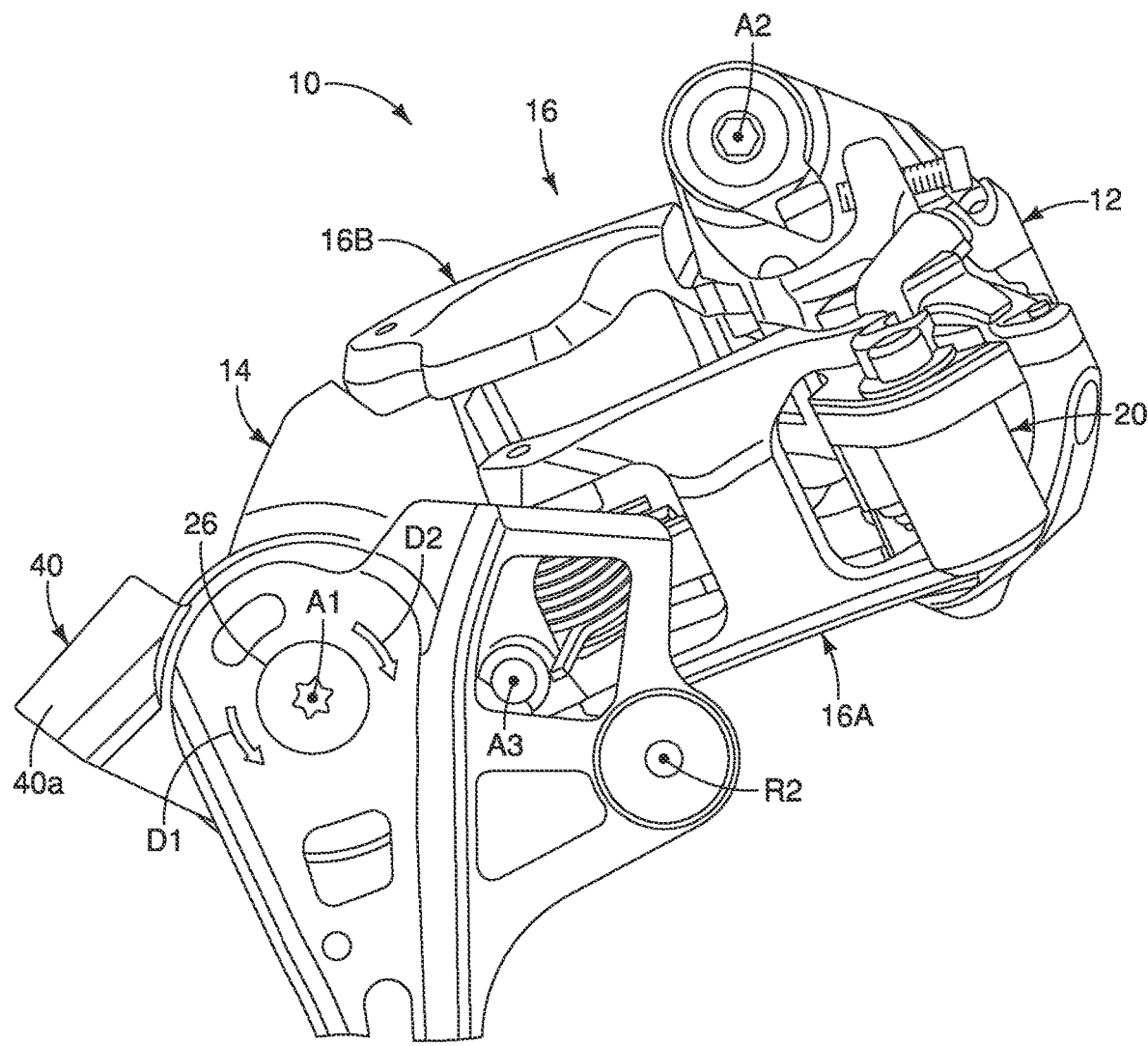
FIG. 9 is an inner side elevational view of a portion of the rear bicycle derailleur illustrated in FIGS. 3 to 8 in which the chain guide is in a use position.

The bicycle derailleur 10 further comprises a switching member 42. The switching member 42 is provided to the movable member 14 to selectively engage the intermediate member 40. In particular, the switching member 42 is configured to be engaged with the intermediate member 40 at the second position, as seen in FIGS. 6 to 8. The switching member 42 is configured to selectively switch the biasing mechanism 36 between the biasing state and a releasing state. Basically, in the biasing state, the chain guide 18 is biased by the biasing mechanism 36. On the other hand, in the releasing state, the chain guide 18 is either free from the torque of the biasing member 38, or the biasing mechanism 36 biases the chain guide 18 less in the releasing state than the biasing state. In the first embodiment, the chain guide 18 is free from the torque of the biasing member 38 in the releasing state. In other words, the torque of the biasing member 38 of the biasing mechanism 36 is effectively disengaged from the chain guide 18 in the releasing state by the switching member 42. In this way, the torque of the biasing member 38 of the biasing mechanism 36 is disengaged from the chain guide 18 in the releasing state. When the chain guide 18 is free from the torque of the biasing member 38, the bicycle chain CN can be easily detached from the chain guide 18.

Basically, the switching member 42 is disengaged from the biasing mechanism 36 in the biasing state. Also, the switching member 42 is engaged with the biasing mechanism 36 in the releasing state. In particular, the switching member 42 is movably coupled to the movable member 14 between an engaging position and a disengaging position. In the engaging position, the switching member 42 is engaged with the intermediate member 40 to establish the releasing state in which the biasing member 38 of the biasing mechanism 36 is effectively disengaged from the chain guide 18. In the disengaging position, the switching member 42 is disengaged from the intermediate member 40 to establish the biasing state in which the biasing member 38 of the biasing mechanism 36 is effectively engaged with the chain guide 18.

In the first embodiment, the chain guide 18 includes a pair of chain cage plates 44. The chain cage plates 44 are constructed of a suitable rigid material such as an aluminum alloy or a fiber reinforced plastic. Preferably, the chain guide 18 includes at least one pulley having a rotational axis spaced from the pivot axis A1 of the chain guide 18. Here, the chain guide 18 includes a tension pulley 46 and a guide pulley 48. The tension pulley 46 and the guide pulley 48 are both rotatably disposed between the chain cage plates 44. The tension pulley 46 rotates about a rotational axis R1. Thee guide pulley 48 rotates about a rotational axis R2. The tension pulley 46 and the guide pulley 48 are constructed of a suitable rigid material such as a plastic. The retracted position of the chain guide 18 corresponds to the guide pulley 48 of the chain guide 18 being positioned over the largest one of the rear sprockets RS. The extended position of the chain guide 18 corresponds to the guide pulley 48 of the chain guide 18 being positioned over the smallest one of the rear sprockets RS.

One of the chain cage plates 44 abuts the intermediate member 40 when the biasing mechanism 36 is in the biasing state. In particular, as seen in FIGS. 11 and 12, the intermediate member 40 includes a biasing portion 40*a* and a first engaging portion 40*b*. The biasing portion 40*a* is configured to contact the chain guide 18 to bias the chain guide 18 in the first direction D1. In the illustrated embodiments, the biasing portion 40*a* contacts an edge of one of biasing portion 40*a* when the biasing mechanism 36 is in the biasing state. The first engaging portion 40*b* is configured to engage with the switching member 42 in a state where the biasing member 38 is in the releasing state. Thus, the biasing portion 40*a* contacts the chain guide 18 to transmit a torque of the biasing member 38 to the chain guide 18 in the biasing state. In the illustrated embodiments, the first engaging portion

40*b* is offset from the biasing portion 40*a* with respect to an axial direction of the pivot axis A1 of the chain guide 18. As seen in FIGS. 11 and 12, the intermediate member 40 further includes a support portion 40*c*. The support portion 40*c* is configured to support the biasing member 38 on the pivot shaft 24. In this way, the biasing member 38 is disposed around the pivot shaft 24. The biasing portion 40*a* and the first engaging portion 40*b* are provided on the outer edge of the support portion 40*c*.

As mentioned above, the switching member 42 is configured to be selectively moved between the disengaging position and the engaging position. In the disengaging position, the switching member 42 is not engaged with the intermediate member 40. In the engaging position, the switching member 42 is engaged with the intermediate member 40 to establish the releasing state in which the biasing member 38 is effectively disengaged from the chain guide 18. To accomplish the engaging position in the illustrated embodiments, the switching member 42 includes a second engaging portion 42*a*. The second engaging portion 42*a* is engaged with the first engaging portion 40*b* in a state where the biasing mechanism 36 is in the releasing state. In particular, the second engaging portion 42*a* is engaged with the first engaging portion 40*b* of the intermediate member 40 to prevent the torque of the biasing member 38 to be transmitted to the chain guide 18 in the engaging position. On the other hand, the second engaging portion 42*a* is disengaged from the first engaging portion 40*b* of the intermediate member 40 in the disengaging position to permit torque of the biasing member 38 to be transmitted to the chain guide 18 in the disengaging position.

Figure 15:
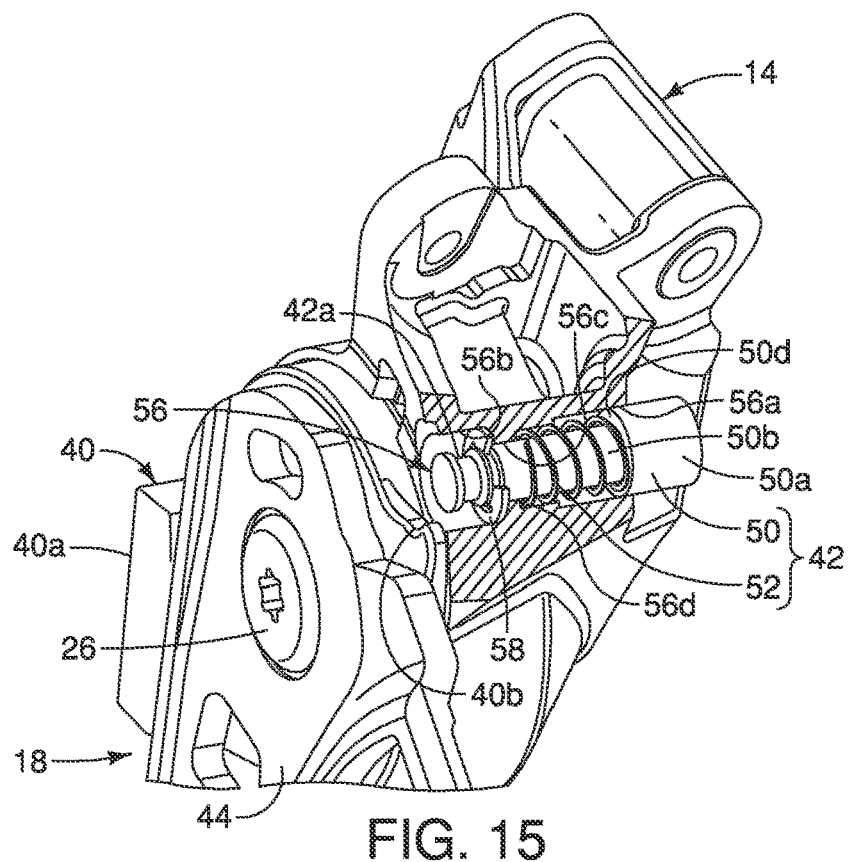
FIG. 15 is a perspective view of a portion of the rear bicycle derailleur illustrated in FIGS. 3 to 8 in which a portion is broken away to show the switching member in the disengaging position.
Figure 16:
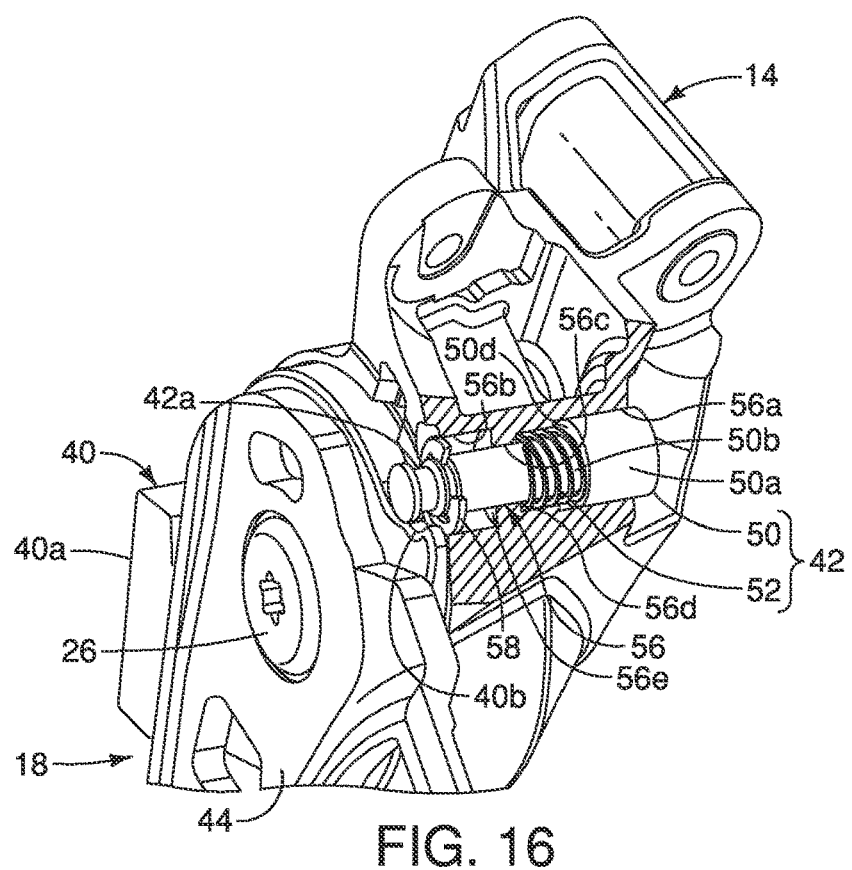
FIG. 16 is a perspective view, similar to FIG. 15, of a portion of the rear bicycle derailleur illustrated in FIGS. 3 to 8 in which a portion is broken away to show the switching member in the engaging position.
Figure 17:
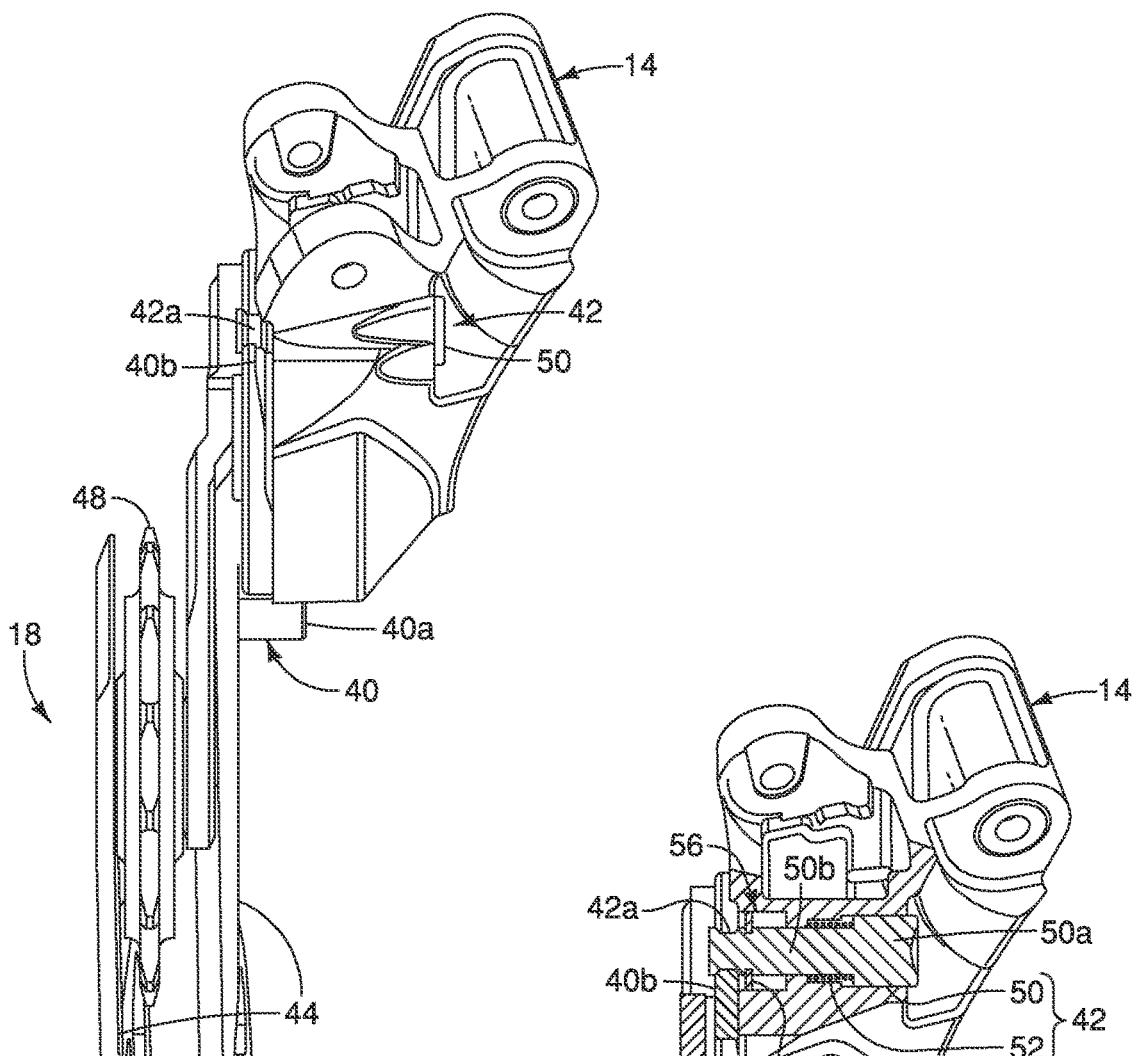
FIG. 17 is an oblique view of a portion of the rear bicycle derailleur illustrated in FIGS. 3 to 8 in which the switching member is in the engaging position.
Figure 18:
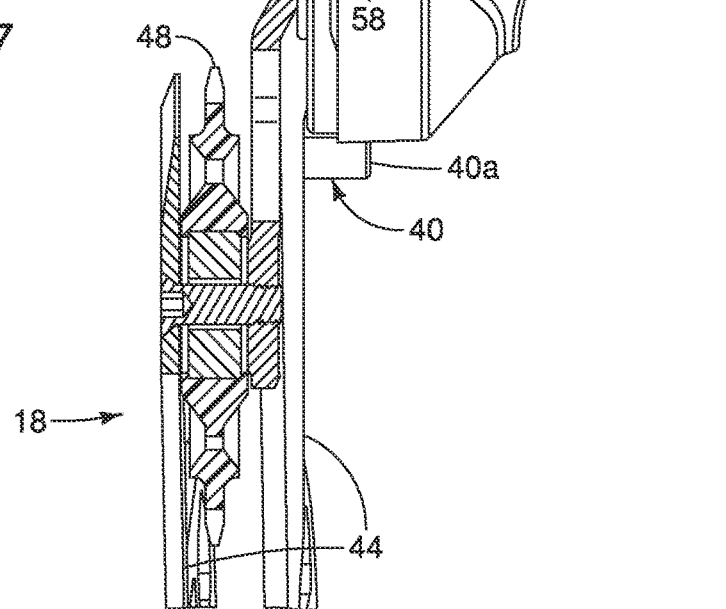
FIG. 18 is an oblique view of a portion of the rear bicycle derailleur illustrated in FIGS. 3 to 8 in which a portion is broken away to show the switching member in the engaging position.

As seen in FIGS. 15 and 16, in the first embodiment, the switching member 42 includes a pin 50 movably coupled to the movable member 14 along a center axis A3 of the pin 50. The center axis A3 of the pin 50 is disposed radially inward of the rotational axis (e.g., the rotational axis R1 or the rotational axis R2) of the at least one pulley (e.g., at least one of the tension pulley 46 and the guide pulley 48) in a radial direction of the pivot axis A1 of the chain guide 18. Preferably, the switching member 42 includes a biasing element 52 biasing the pin 50 towards the disengaging position. Thus, the switching member 42 is biased towards the disengaging position. Here, the biasing element 52 includes a coil compression spring that wrapped around the pin 50. Alternatively, the biasing element 52 can be omitted. If the biasing element 52 is omitted, then, for example, the switching member 42 can be preferably provided with a detent member or other retaining structure that selectively retains the pin 50 in each of the disengaging position and the engaging position.

Here, for example, as seen in FIGS. 15 and 16, the pin 50 is movably disposed in an axial direction of a through hole 56 of the movable member 14. Here, the center axis A3 of the pin 50 is parallel to the pivot axis A1 of the chain guide 18. The through hole 56 includes a first cylindrical section 56*a*, a second cylindrical section 56*b* and a third cylindrical section 56*c*. The first cylindrical section 56*a* opens to the outer side (non-frame facing side) of the movable member 14. The second cylindrical section 56*b* extends between the first cylindrical section 56*a* and the third cylindrical section 56*c*. The third cylindrical section 56*c* opens to the inner side (frame facing side) of the movable member 14. The second cylindrical section 56*b* has a smaller inner diameter than the inner diameter of the first cylindrical section 56*a* to form a first abutment 56*d*. The second cylindrical section 56*b* also has a smaller inner diameter than the inner diameter of the third cylindrical section 56*c* to form a second abutment 56*e* as seen in FIG. 16.

Basically, the pin 50 includes the second engaging portion 42*a*. Here, the second engaging portion 42*a* includes an annular recess disposed in the outer surface of the pin 50 for receiving the first engaging portion 40*b* of the intermediate member 40. The pin 50 further includes a user input portion 50*a* and a guide portion 50*b*. The second engaging portion 42*a* is provided on the opposite end of the guide portion 50*b* from the user input portion 50*a*. The pin 50 is retained in the through hole 56 by a retainer 58 (e.g., a C-clip) that disposed in a groove of the guide portion 50*b*. The user input portion 50*a* has a larger outer diameter than the outer diameter of the guide portion 50*b* to form a third abutment 50*d*. The biasing element 52 is disposed around the guide portion 50*b*. The biasing element 52 abuts against the first abutment 56*d* and the third abutment 50*d* to bias the pin 50 towards the disengaging position as seen in FIG. 15. In the disengaging position, the retainer 58 biased against the second abutment 56*e* to establish the pin 50. Where the switching member 42 is in the disengaging position as seen in FIG. 15, the user input portion 50*a* is partly disposed in the first cylindrical section 56*a* of the through hole 56 and partly extends out of the first cylindrical section 56*a* of the through hole 56. The second engaging portion 42*a* is partly disposed in the first cylindrical section 56*a* of the through hole 56 and partly disposed in the second cylindrical section 56*b* of the through hole 56 when the switching member 42 is in the disengaging position as seen in FIG. 15. In the disengaging position of the switching member 42, the user input portion 50*a* protrudes out of the through hole 56 of the movable member 14, and the second engaging portion 42*a* is spaced from the intermediate member 40.

The user input portion 50*a* is pushed by a user to move the pin 50 in the axial direction of the through hole 56 against the force of the biasing element 52 towards the intermediate member 40 to move from the disengaging position to the engaging position. In the disengaging position of the switching member 42, the user input portion 50*a* protrudes out of the through hole 56 of the movable member 14, and the second engaging portion 42*a* is spaced from the intermediate member 40.

Figure 19:
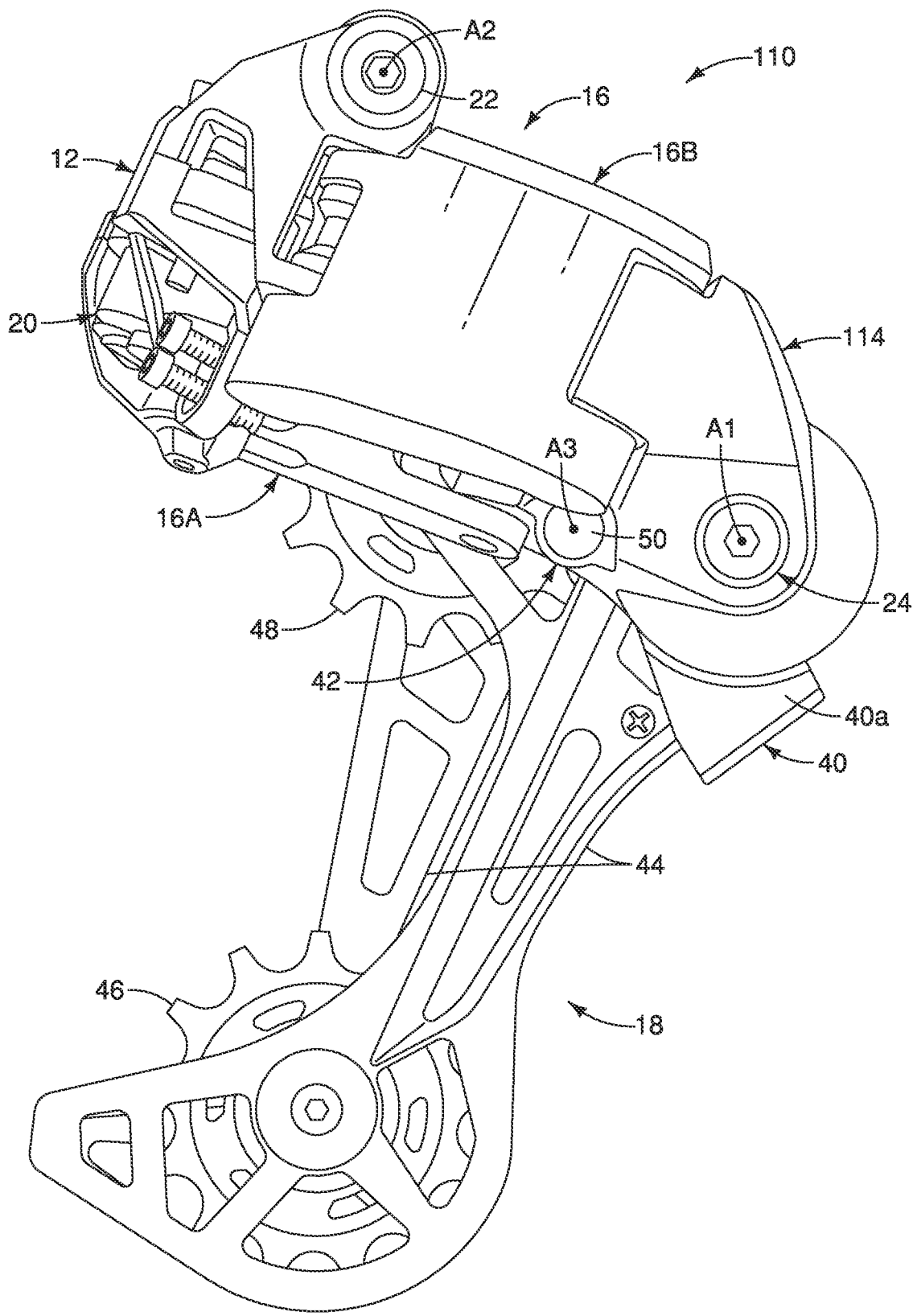
FIG. 19 is an outer side elevational view of a rear bicycle derailleur in accordance with a second embodiment.
Figure 20:
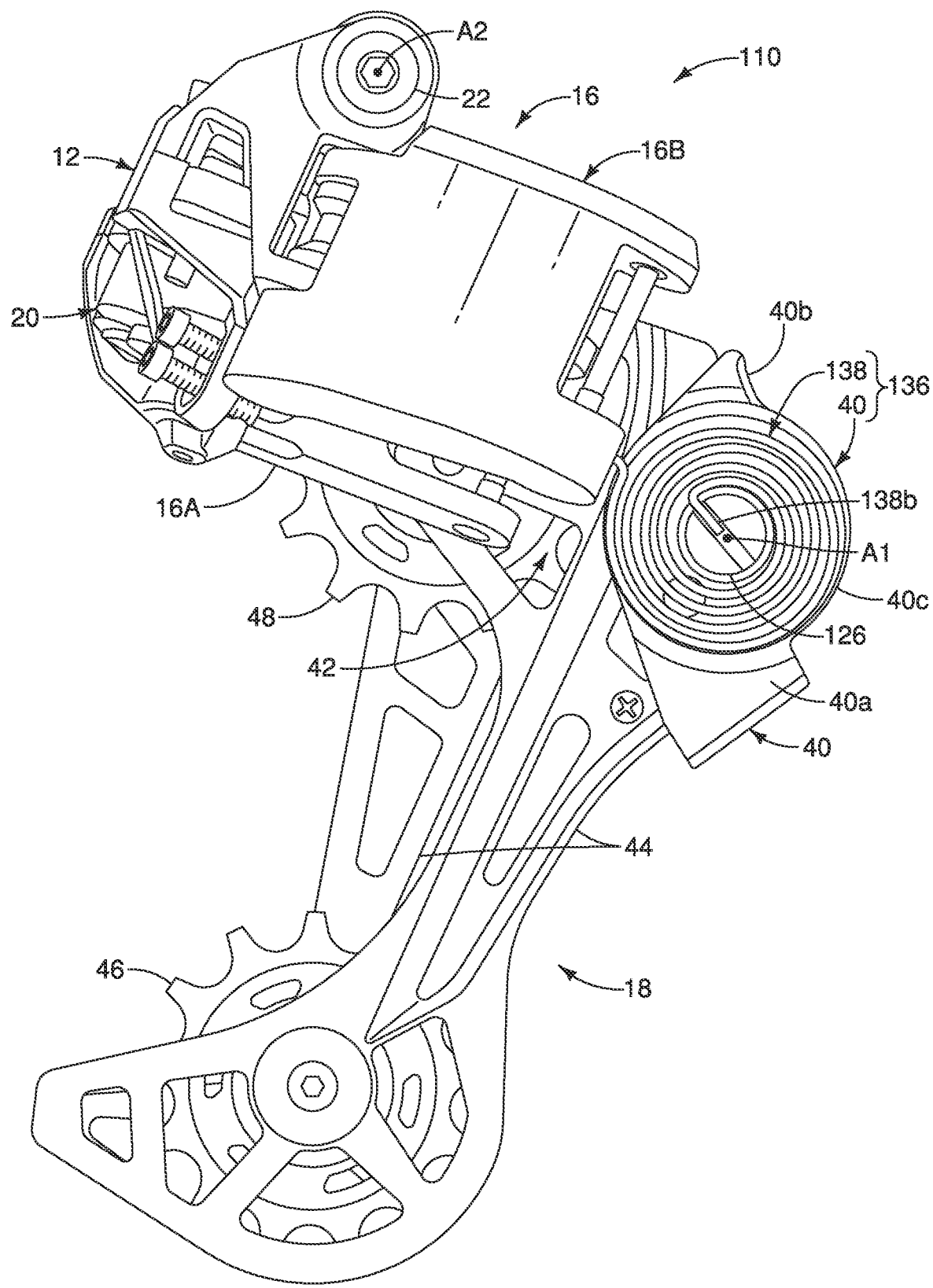
FIG. 20 is an outer side elevational view of the rear bicycle derailleur illustrated in FIG. 19, but in which the movable member as been removed.
Figure 21:
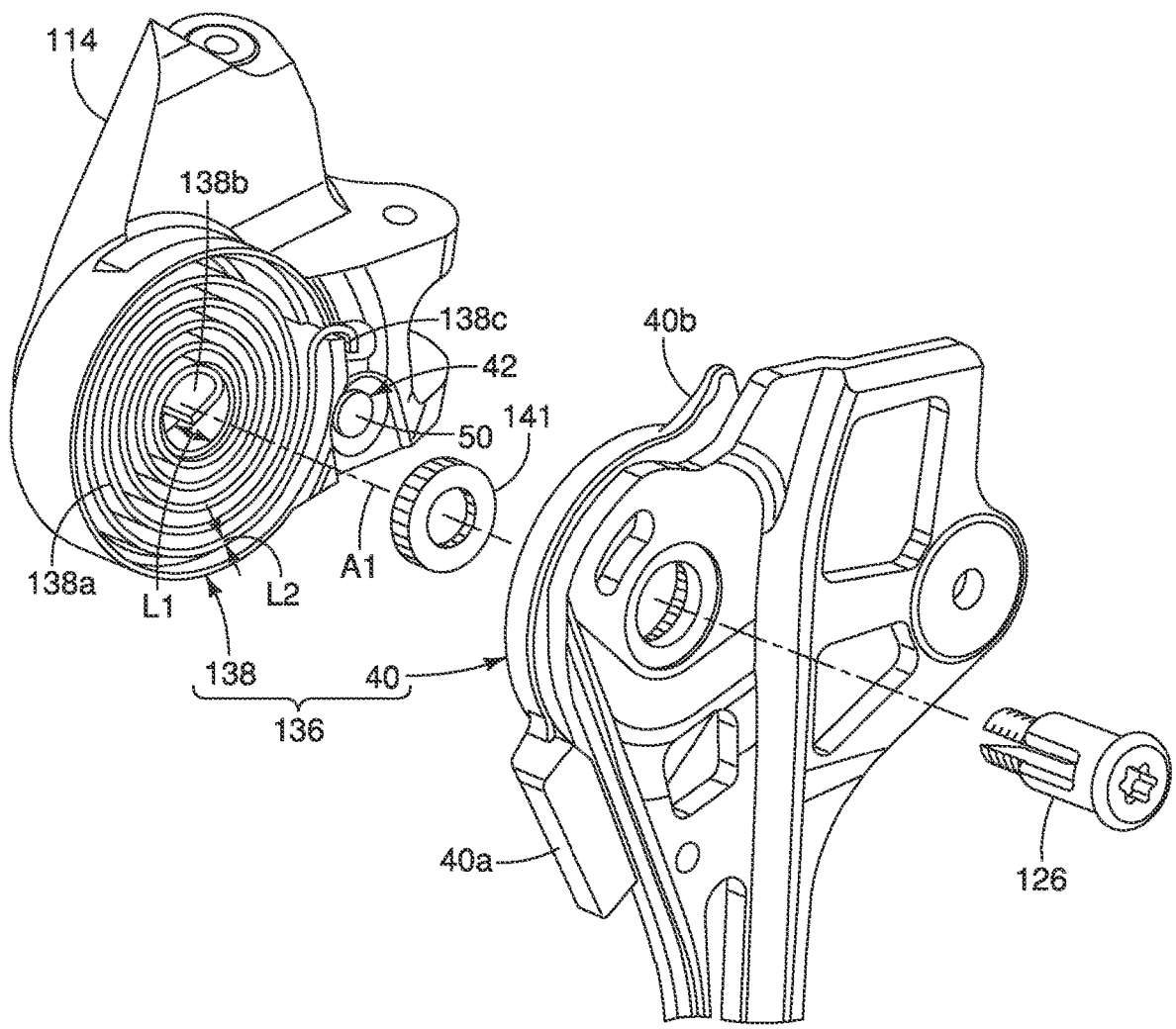
FIG. 21 is a partially exploded perspective view of a portion of the rear bicycle derailleur illustrated in FIGS. 19 and 20.
Figure 22:
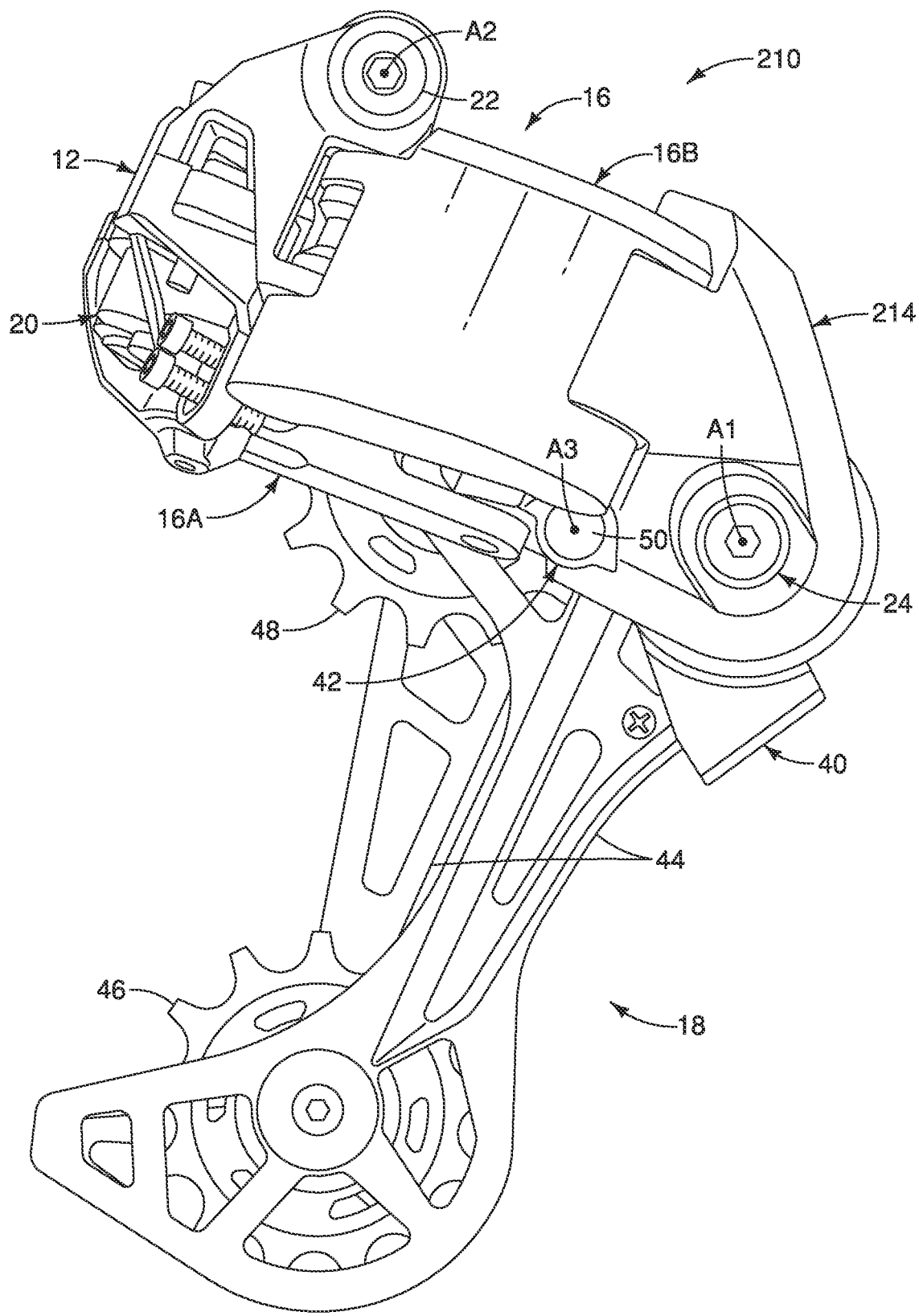
FIG. 22 is an outer side elevational view of a rear bicycle derailleur in accordance with a third embodiment.
Figure 23:
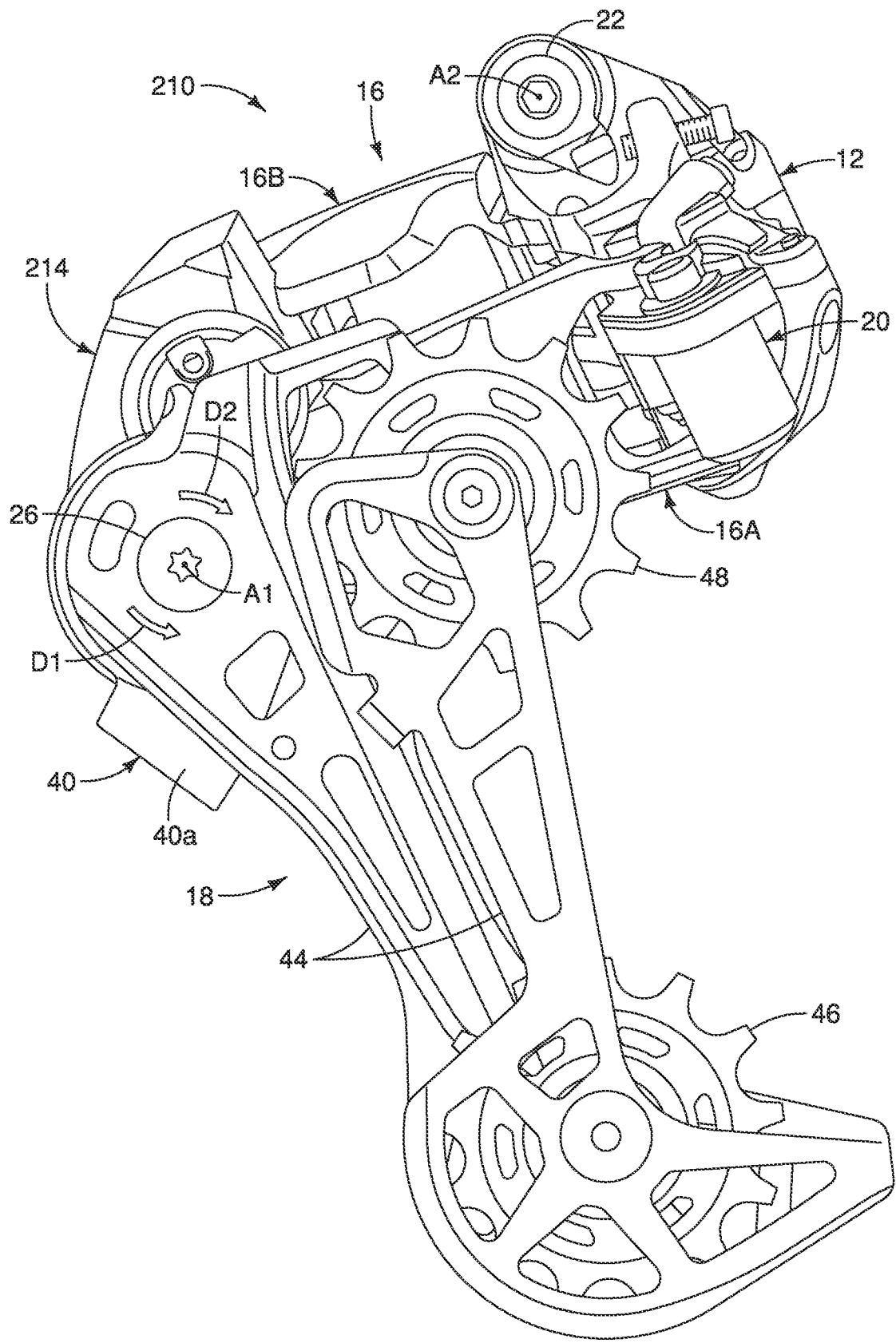
FIG. 23 is an inner side elevational view of the rear bicycle derailleur illustrated in FIG. 22.

Referring now to FIGS. 19 to 21, a bicycle derailleur 110 is illustrated in accordance with a second embodiment. The bicycle derailleur 110 is identical to the bicycle derailleur 10, except that the bicycle derailleur 110 has a modified movable member 114 and a modified biasing mechanism 136 as explained below. In view of the similarity between the first embodiment and the second embodiment, the parts of the second embodiment that are identical to the parts of the first embodiment will be given the same reference numerals as the parts of the first embodiment. Moreover, the descriptions of the parts of the second embodiment that are identical to the parts of the first embodiment will not be repeated for the sake of brevity. For example, the movable member 114 includes the switching member 42, which is described in detail with respect to the first embodiment. Also, the modified biasing mechanism 136 includes the intermediate member 40, which is described in detail with respect to the first embodiment. Therefore, the above descriptions of the intermediate member 40 and the above descriptions of the switching member 42 apply to this embodiment.

Here, the pivot shaft 24 is coupled to a fixing bolt 126 to pivotally support the movable member 114 relative to the chain guide 18. The intermediate member 40 is fixed to the fixing bolt 126 by a spline connection or a press-fit connection, while the chain guide 18 is rotatably supported on the fixing bolt 126. For example, an adapter 141 is connected to the intermediate member 40 by a spline connection or a press-fit connection. The adapter 141 is further connected to the fixing bolt 126 by a spline connection or a press-fit connection. In this way, the intermediate member 40 is fixed to the fixing bolt 126. The fixing bolt 126 is connected to the biasing mechanism 136 so that the torque of the biasing mechanism 136 transmitted to the intermediate member 40.

In the bicycle derailleur 110, the biasing mechanism 136 includes a biasing member 138 and the intermediate member 40, which is the same as the first embodiment. The bicycle derailleur 110 further includes the switching member 42 of the first embodiment. Thus, the switching member 42 is configured to be selectively moved between the disengaging position in which the switching member 42 is not engaged with the intermediate member 40, and the engaging position in which the switching member 42 is engaged with the intermediate member 40. In the engaging position, the switching member 42 is engaged with the intermediate member 40 to establish the releasing state in which the biasing member 138 is effectively disengaged from the chain guide 18.

Here, the biasing member 138 is a spiral torsion spring having a spiral shape as viewed parallel to the pivot axis A1. The biasing member 138 includes a coil portion 138*a* that wraps around the pivot axis A1. The biasing member 138 further includes a first end portion 138*b* that hooks onto the fixing bolt 126. In this way, the first end portion 138*b* is coupled to the intermediate member 40. The biasing member 138 further includes a second end portion 138*c* that hooks onto the movable member 114. In this way, the second end portion 138*c* is coupled to the movable member 114. The first end portion 138*b* of the biasing member 138 is located radially inward of the coil portion 138*a*. The second end portion 138*c* is located radially outward of the coil portion 138*a*. Preferably, the biasing member 138 is preloaded so that the first engaging portion 40*b* is engaged with the chain guide 18 to transmit a torque of the biasing member 138 to the chain guide 18 in the biasing state.

As seen in FIG. 21, here, the biasing member 138 is formed of a metal sheet that is coiled to form the coil portion 138*a*. The metal sheet forming the biasing member 138 has a width L1 in the axial direction with respect to the pivot axis A1, and a thickness L2 in the radial direction with respect to the pivot axis A1. The width L1 of the metal sheet forming the biasing member 138 is greater than the thickness L2 of the metal sheet forming the biasing member 138. In this way, the width of the movable member 114 in the axial direction with respect to the pivot axis A1 can be reduced as compared with the movable member 14 which the biasing member 38 is utilized as in the first embodiment.

While the bicycle derailleur 110 has been described as including the intermediate member 40 and the switching member 42, the intermediate member 40 and the switching member 42 can be omitted from the bicycle derailleur 110 as needed and/or desired. In the case where the intermediate member 40 and the switching member 42 are omitted, the end portion of the biasing member 138 is fixed to or engaged with the chain guide 18. Alternatively, in the case where the intermediate member 40 and the switching member 42 are omitted, the end portion of the biasing member 138 is fixed to or engaged with a part that is fixed to the chain guide 18.

Referring now to FIGS. 22 to 31, a bicycle derailleur 210 is illustrated in accordance with a third embodiment. The bicycle derailleur 210 is identical to the bicycle derailleur 10, except that the bicycle derailleur 210 has a modified movable member 214 and a modified biasing mechanism 236 as explained below. In view of the similarity between the first embodiment and the third embodiment, the parts of the third embodiment that are identical to the parts of the first embodiment will be given the same reference numerals as the parts of the first embodiment. Moreover, the descriptions of the parts of the third embodiment that are identical to the parts of the first embodiment will not be repeated for the sake of brevity. For example, the movable member 114 includes the switching member 42, which is described in detail with respect to the first embodiment. Also, the modified biasing mechanism 136 includes the intermediate member 40, which is described in detail with respect to the first embodiment. Therefore, the above descriptions of the intermediate member 40 and the above descriptions of the switching member 42 apply to this embodiment.

In the bicycle derailleur 210, the biasing mechanism 236 includes a biasing member 238 and the intermediate member 40, which is the same as the first embodiment. The biasing member 238 includes a torsion spring. The bicycle derailleur 210 further includes the switching member 42 of the first embodiment. Thus, the switching member 42 is configured to be selectively moved between the disengaging position in which the switching member 42 is not engaged with the intermediate member 40, and the engaging position in which the switching member 42 is engaged with the intermediate member 40. In the engaging position, the switching member 42 is engaged with the intermediate member 40 to establish the releasing state in which the biasing member 238 is effectively disengaged from the chain guide 18.

Here, the biasing member 238 is offset from the pivot axis A1. In particular, the bicycle derailleur 210 further comprises a torque changing mechanism 260. The torque changing mechanism 260 is operatively disposed between the chain guide 18 and the biasing member 238. The torque changing mechanism 260 is configured to change a torque provided from biasing member 238 to the chain guide 18.

The torque changing mechanism 260 includes a first cam 261, a second cam 262 and a cable 263. The first cam 261 is rotatably mounted to the movable member 214 to rotate around a rotation axis A4. The second cam 262 is rotatably mounted to the movable member 214 to pivot with the intermediate member 40 around the pivot axis A1. The cable 263 connects the first cam 261 and the second cam 262. Thus, rotation of the second cam 262 causes rotation of the first cam 261 via the cable 263. The rotation axis A4 is different from the pivot axis A1. The rotation axis A4 is parallel to the pivot axis A1, and is offset from the pivot axis A1. Here, an adapter 264 fixedly connects the intermediate member 40 to the second cam 262 so that the intermediate member 40 and the second cam 262 pivot together about the pivot axis A1 relative to the movable member 214. In this embodiment, the pivot shaft 24 is fixed to the intermediate member 40 and the second cam 262. The movable member 214 is provided with a bushing 265 that rotatably supports the pivot shaft 24 with respect to the movable member 214. In this way, the pivot shaft 24, the intermediate member 40 and the second cam 262 can rotate relative to the movable member 214. Similar to the other embodiments, the chain guide 18 is engaged with the intermediate member 40 so that the chain guide 18 is biased in the first direction D1 around the pivot axis A1 by the biasing member 238 while in the biasing state. Also, similar to the other embodiments, the switching member 42 is configured to selectively switch the biasing mechanism 236 between the biasing state and a releasing state.

Figure 24:
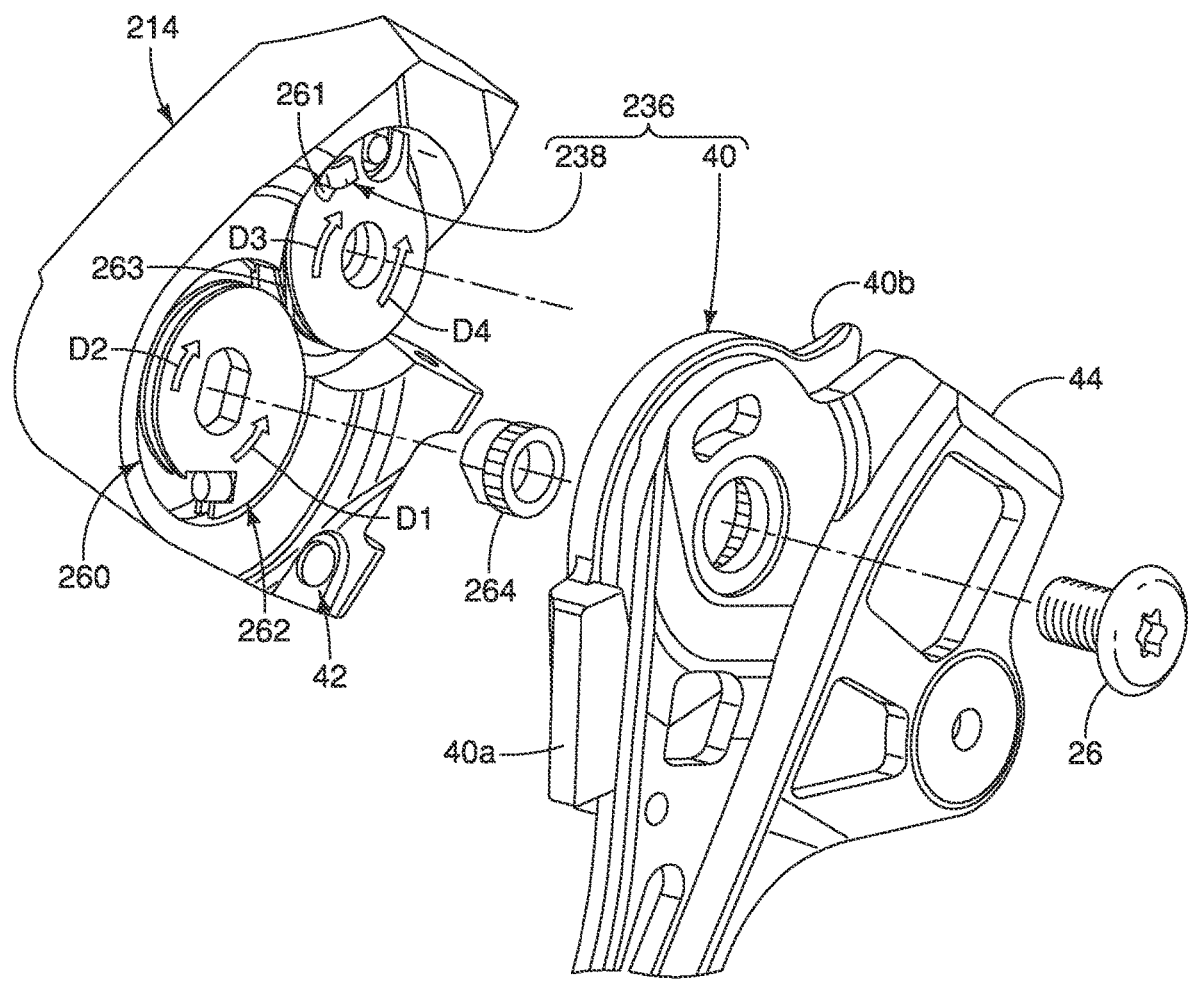
FIG. 24 is a partially exploded perspective view of a portion of the rear bicycle derailleur illustrated in FIGS. 22 and 23.
Figure 25:
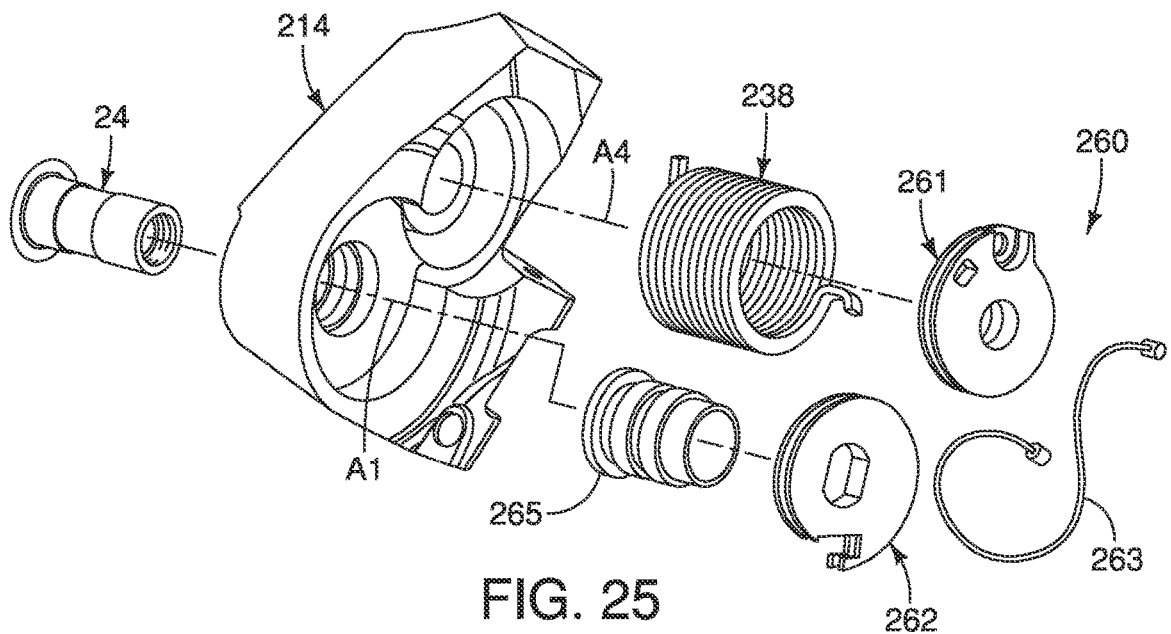
FIG. 25 is a partially exploded perspective view of selected parts of the rear bicycle derailleur illustrated in FIGS. 22 and 23.

Referring to FIGS. 24 and 25, the biasing member 238 is operatively disposed between the movable member 214 and the first cam 261 to bias by the first cam 261 around the rotation axis A4 relative to the movable member 214. In particular, the first cam 261 is biased in a third direction D3 around the rotation axis A4 by the biasing member 238. Since the cable 263 connects the first cam 261 and the second cam 262, the torque of the biasing member 238 is transmitted from the first cam 261 to the second cam 262 via the cable 263. Thus, the second cam 262 is biased in the first direction D1 around the pivot axis A1 by the biasing member 238.

Figure 26:
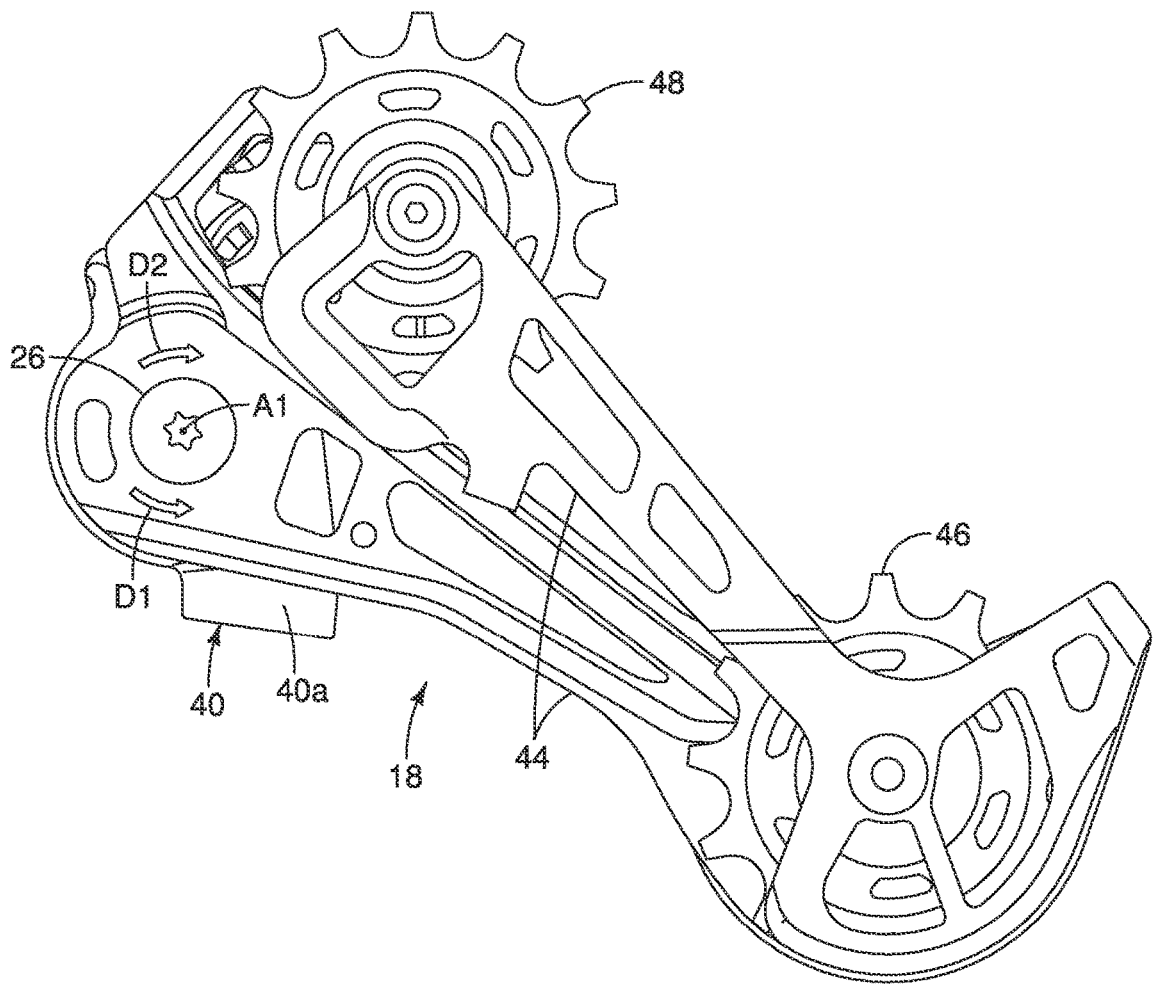
FIG. 26 is a partial inner side elevational view of the movable member and the chain guide of the rear bicycle derailleur in FIGS. 22 and 23 in which the chain guide is the top gear position.
Figure 27:
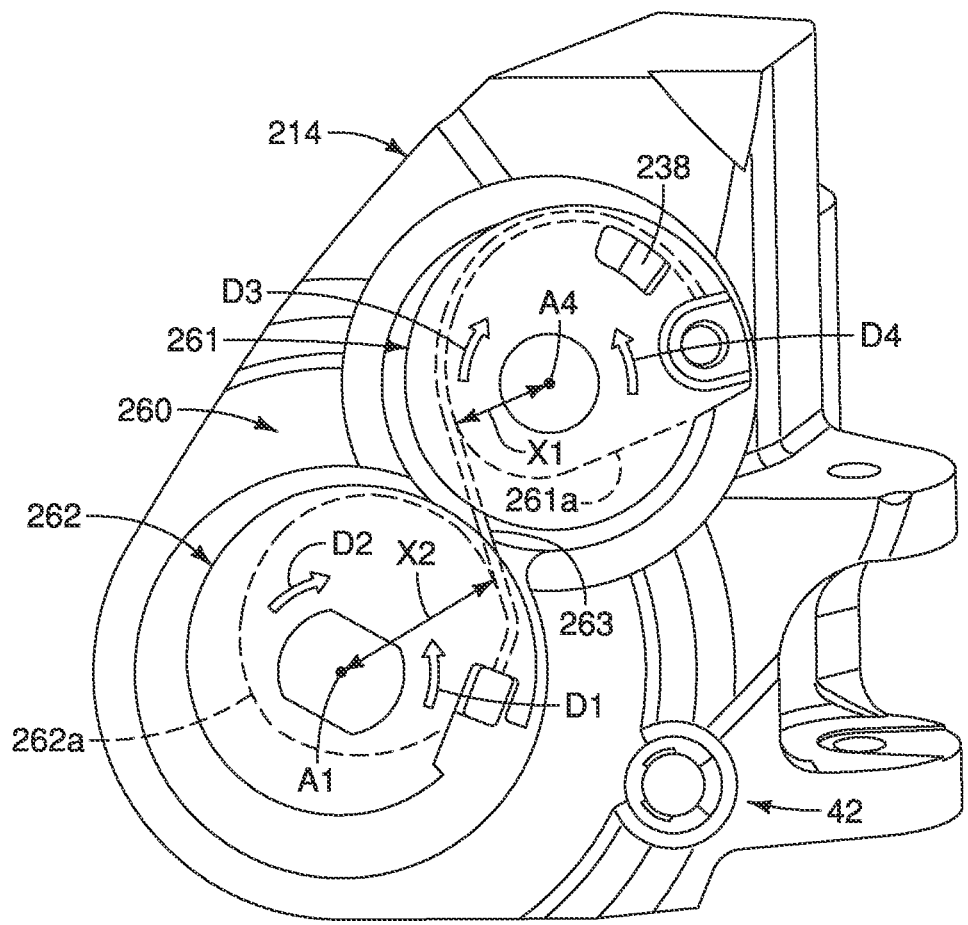
FIG. 27 is an enlarged elevational view of the movable member and the torque changing mechanism of the rear bicycle derailleur in FIGS. 22 and 23 in which the torque changing mechanism is the top gear position.

Referring now to FIGS. 26 and 27, the chain guide 18 and the torque changing mechanism 260 are illustrated in the top gear position. In the top gear position, the first cam 261 has been pivoted in the third direction D3 around the rotation axis A4 to a top gear position and the second cam 262 has been pivoted in the first direction D1 around the pivot axis A1 to a top gear position. In particular, the top gear position is established by an abutment pin of the chain guide 18 abuts against the movable member 214, which prevents any further movement of the chain guide 18 in the first direction D1.

Figure 28:
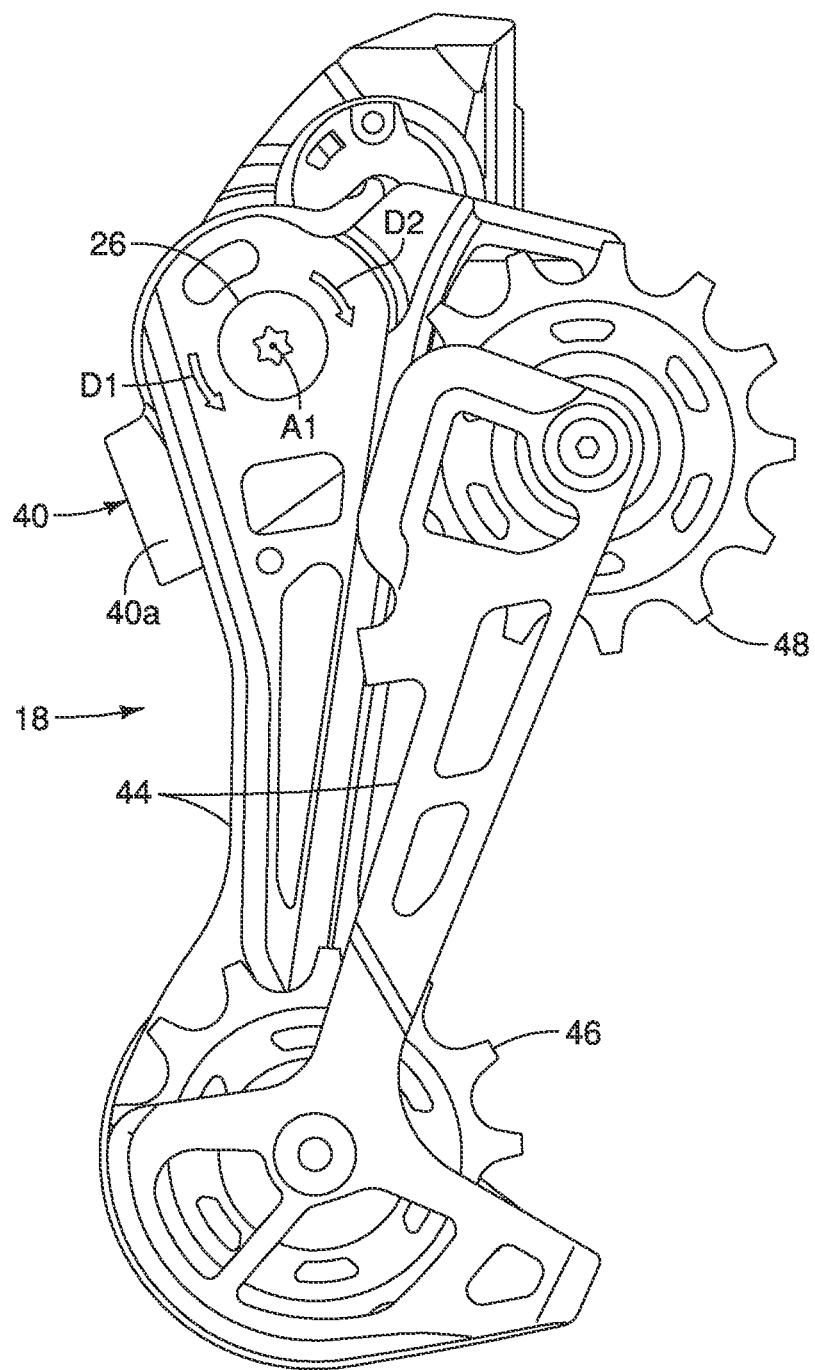
FIG. 28 is a partial inner side elevational view of the movable member and the chain guide of the rear bicycle derailleur in FIGS. 22 and 23 in which the chain guide is the middle gear position.
Figure 29:
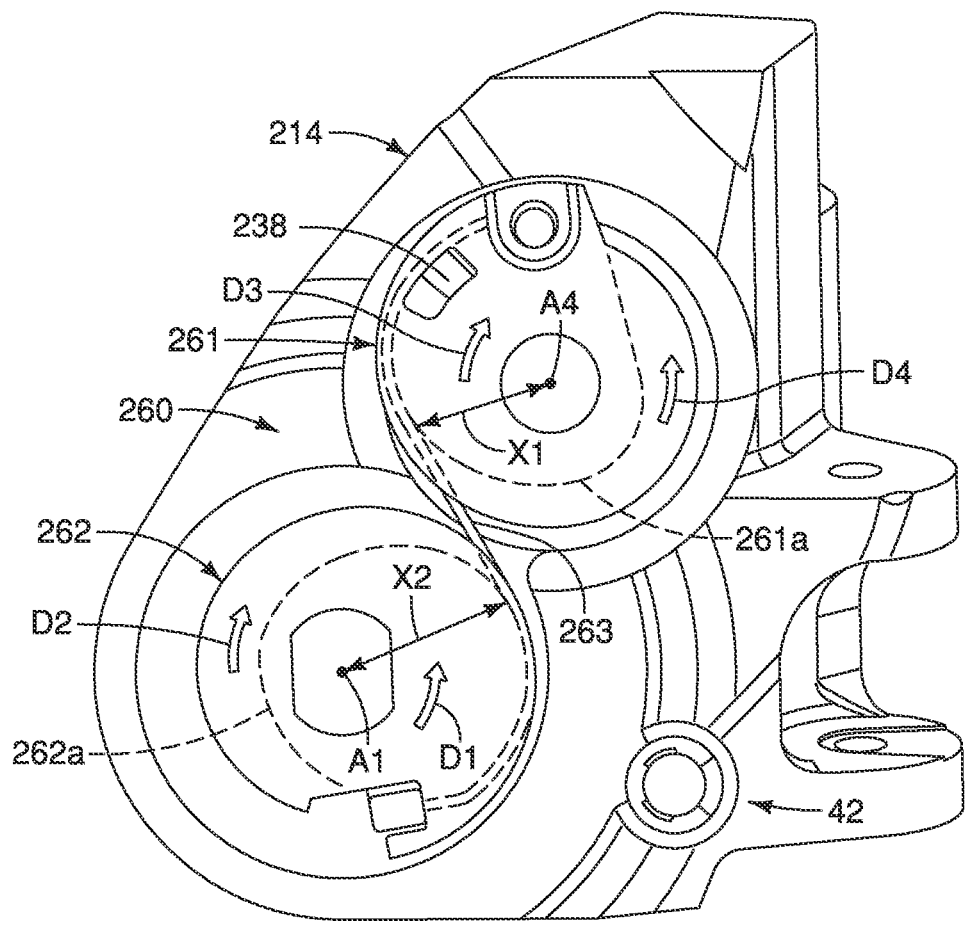
FIG. 29 is an enlarged elevational view of the movable member and the torque changing mechanism of the rear bicycle derailleur in FIGS. 22 and 23 in which the torque changing mechanism is the middle gear position.

Referring now to FIGS. 28 and 29, the chain guide 18 and the torque changing mechanism 260 are illustrated in a middle gear position. In particular, the chain guide 18 is pivoted in the second direction D2 around the pivot axis A1, which causes the second cam 262 to pivot in the second direction D2 around the pivot axis A1 and the first cam 261 to pivot in the fourth direction D4 around the rotation axis A4. As a result of the first cam 261 pivoting in the fourth direction D4 around the rotation axis A4, the spring tension in the biasing member 238 becomes larger. However, as explained below, the torque transmitted to the chain guide 18 becomes smaller due to the shapes of the first cam 261 and the second cam 262.

Figure 30:
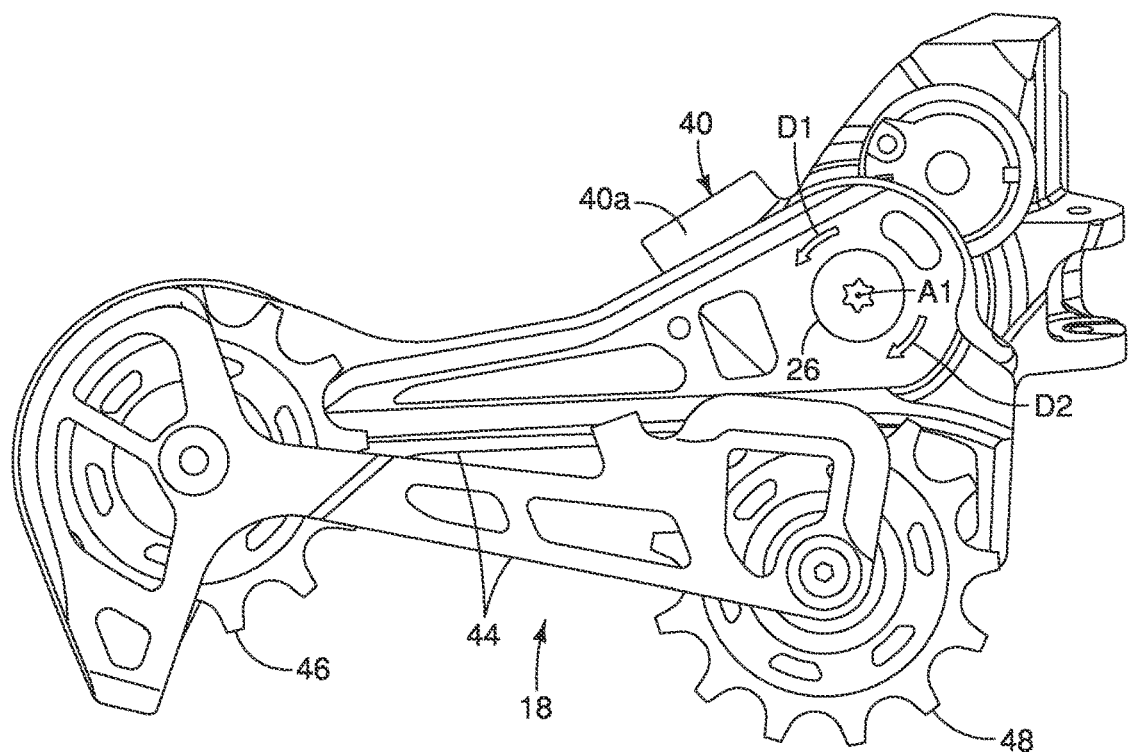
FIG. 30 is a partial inner side elevational view of the movable member and the chain guide of the rear bicycle derailleur in FIGS. 22 and 23 in which the chain guide is the low gear position.
Figure 31:
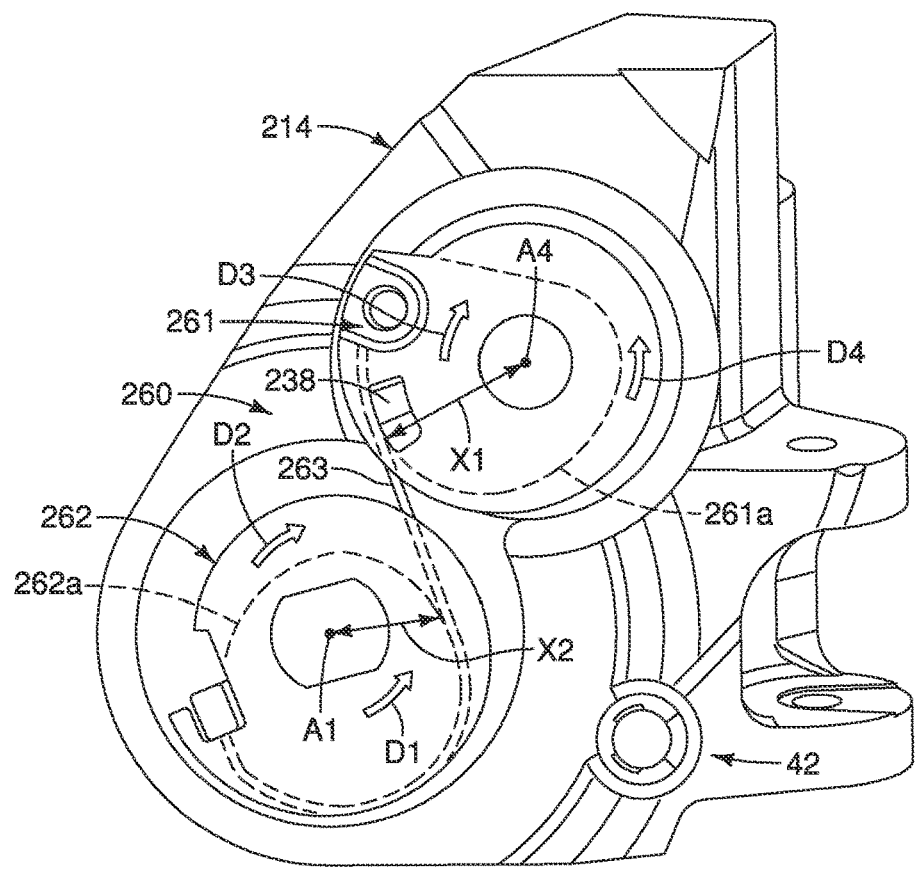
FIG. 31 is an enlarged elevational view of the movable member and the torque changing mechanism of the rear bicycle derailleur in FIGS. 22 and 23 in which the torque changing mechanism is the low gear position.
Figure 32:
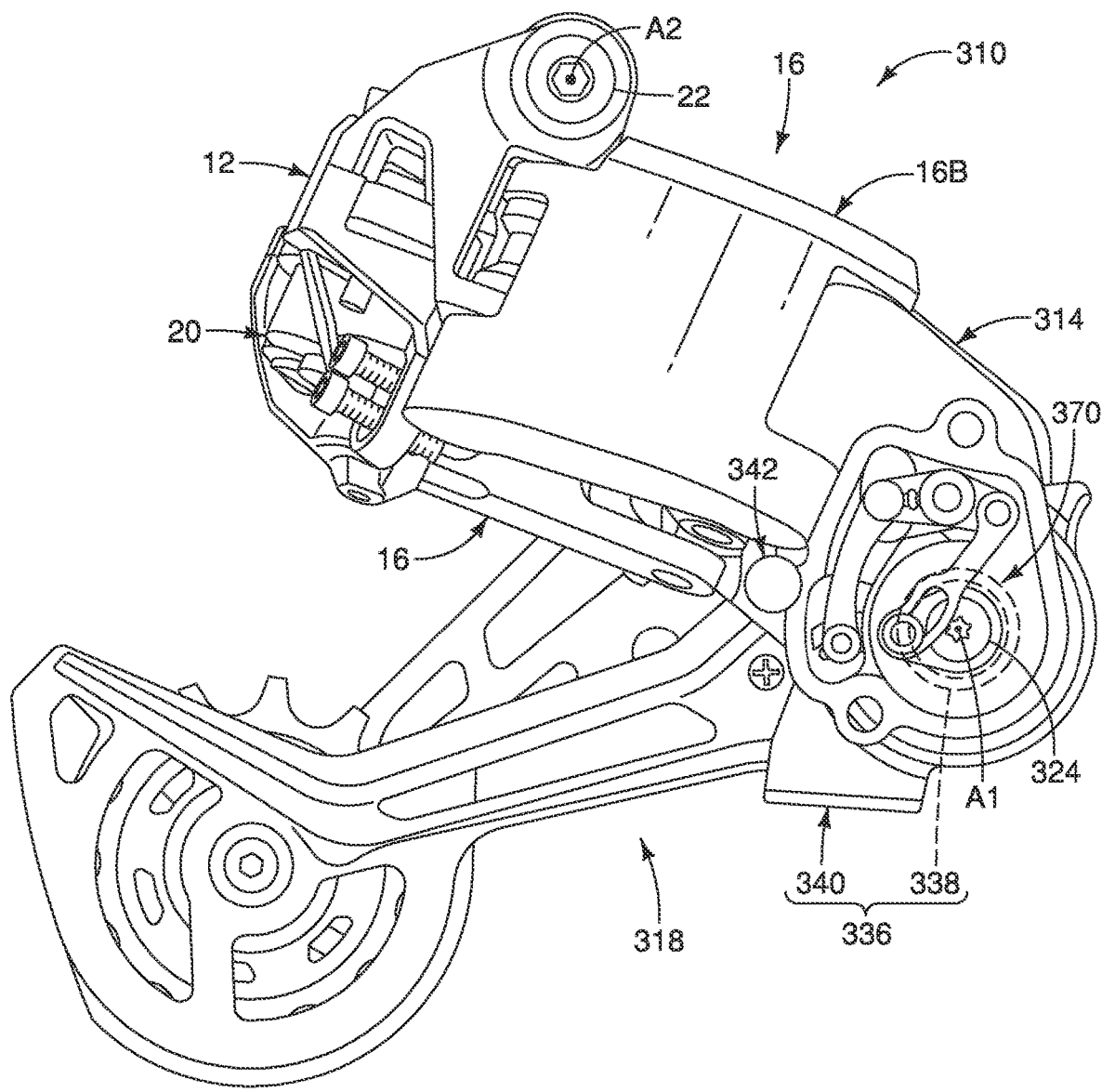
FIG. 32 is an outer side elevational view of a rear bicycle derailleur in accordance with a fourth embodiment.
Figure 33:
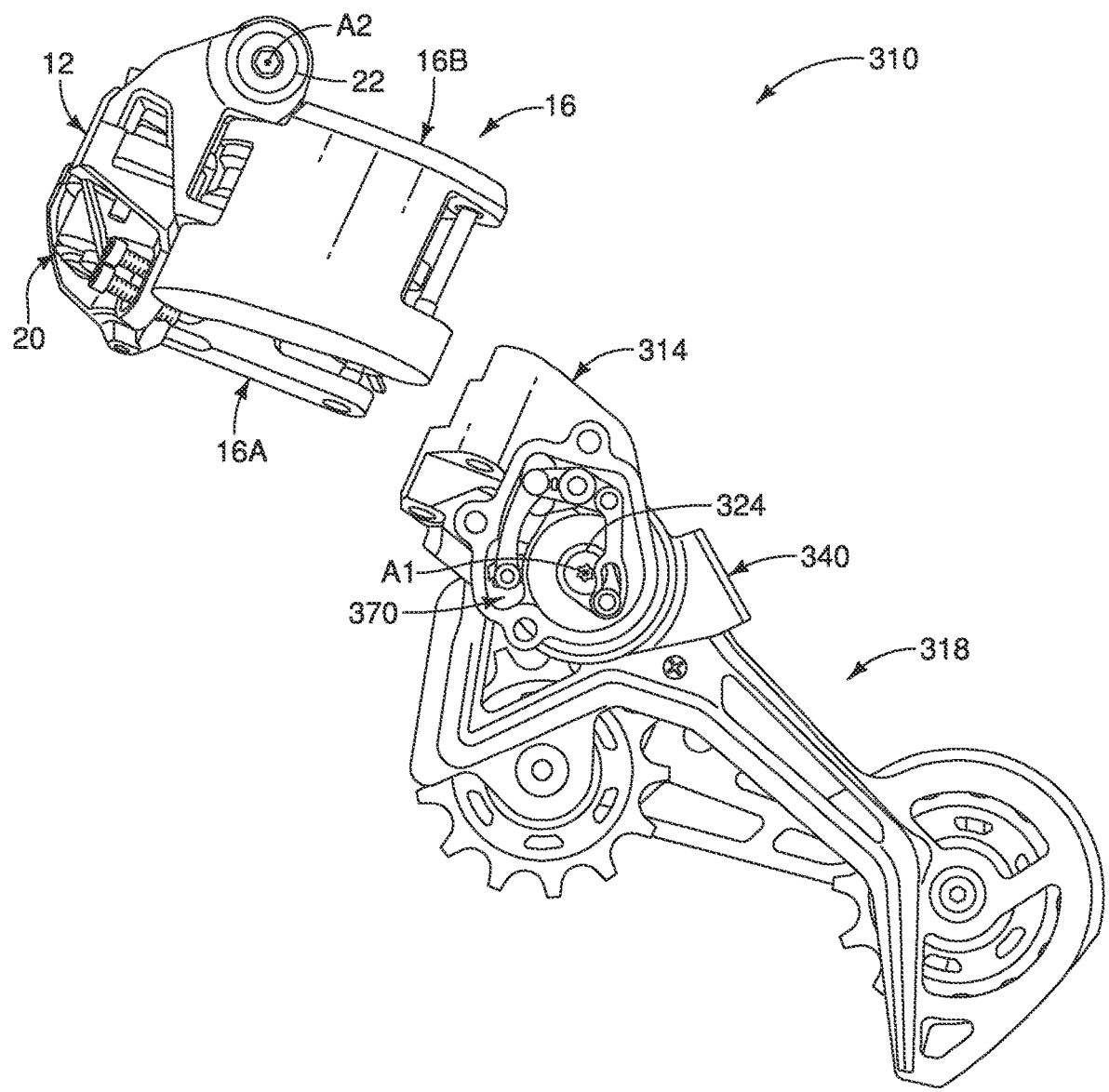
FIG. 33 is a partially exploded elevational view of the rear bicycle derailleur illustrated in FIG. 32 in which the chain guide is held in a non-use position
Figure 34:
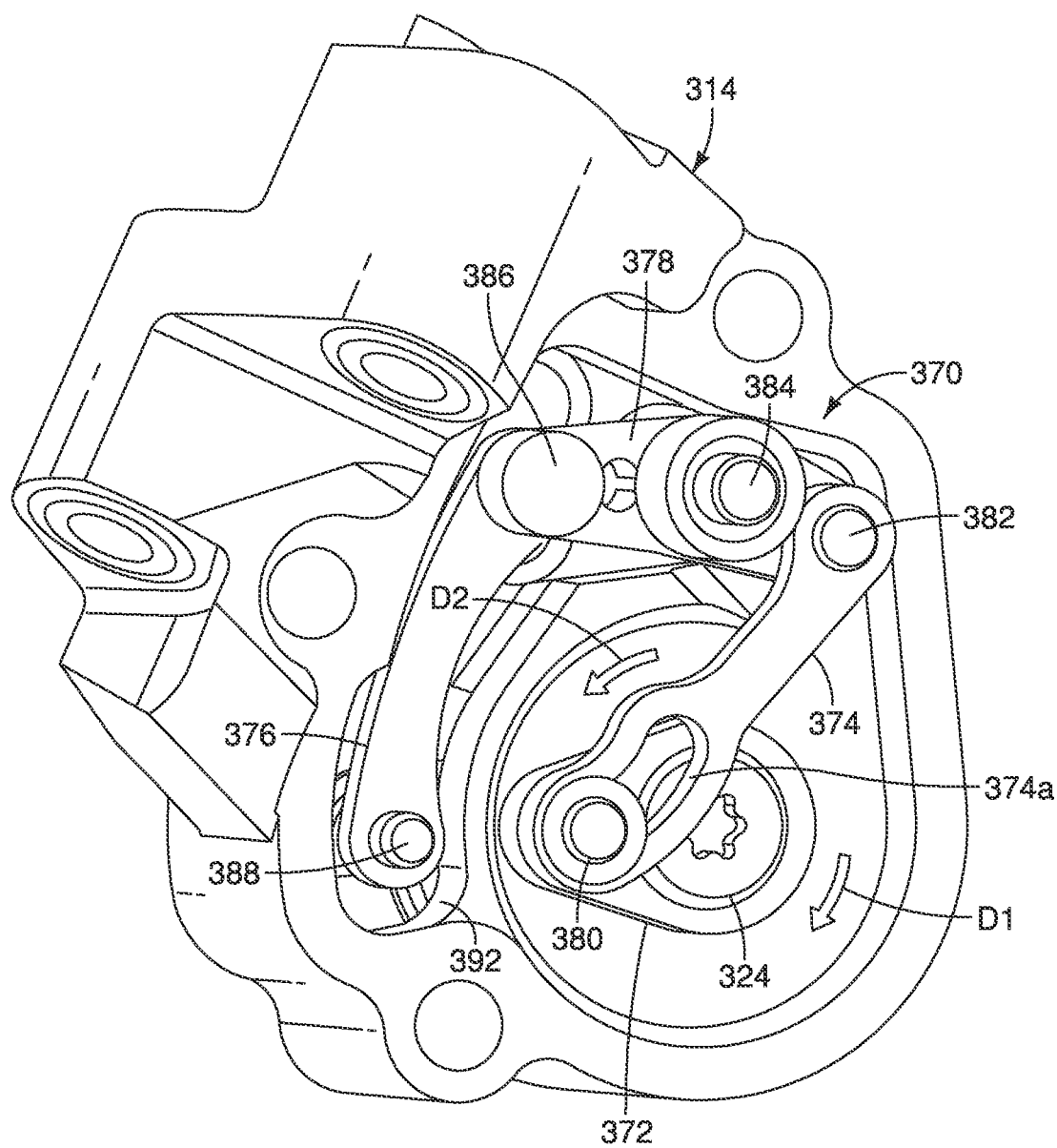
FIG. 34 is a perspective view of selected parts of the movable member of the rear bicycle derailleur illustrated in FIGS. 32 and 33.
Figure 35:
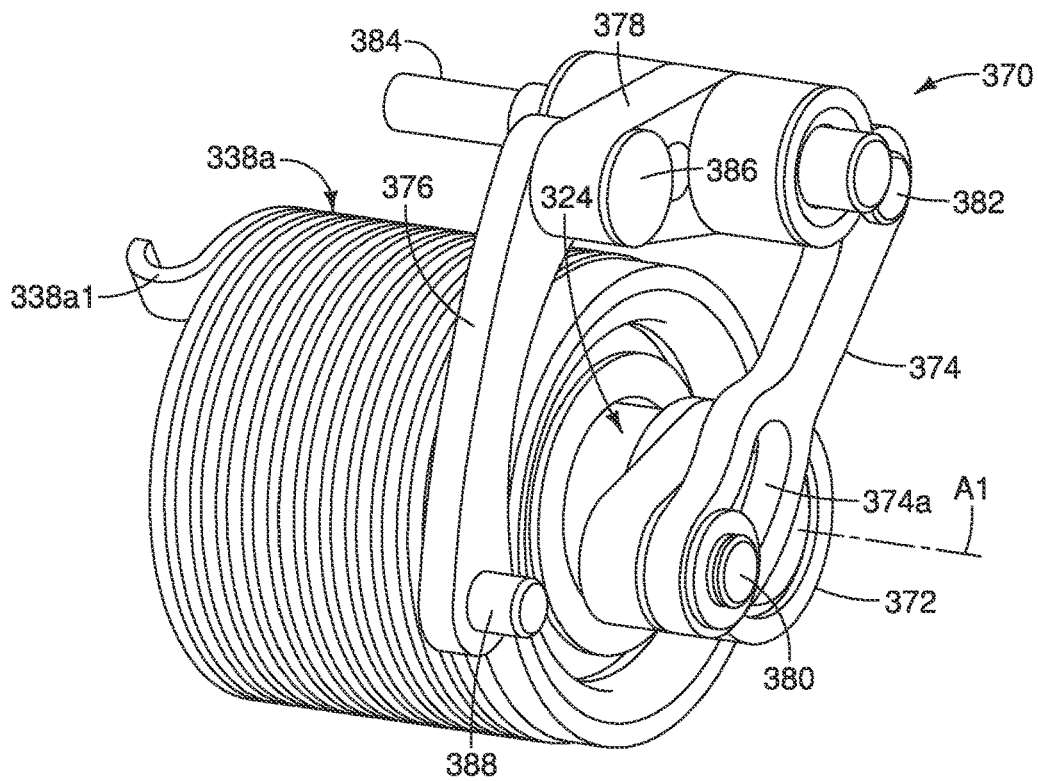
FIG. 35 is a first side perspective view of selected parts of the switching member of the movable member illustrated in FIGS. 32 to 34.

Referring now to FIGS. 30 and 31, the chain guide 18 and the torque changing mechanism 260 are illustrated in the low gear position. In particular, the chain guide 18 is pivoted further in the second direction D2 around the pivot axis A1, which causes the second cam 262 to pivot further in the second direction D2 around the pivot axis A1 and the first cam 261 to pivot further in the fourth direction D4 around the rotation axis A4. As a result of the first cam 261 pivoting in the fourth direction D4 around the rotation axis A4, the spring tension in the biasing member 238 becomes even larger. However, as explained below, the torque transmitted to the chain guide 18 becomes even smaller due to the shapes of the first cam 261 and the second cam 262.

An outer cable winding surface 261a of the first cam 261 is eccentrically arranged relative to the rotation axis A4. Thus, the outer cable winding surface 261a of the first cam 261 has a first radial distance X1 that varies around its periphery. The first radial distance X1 is measured from the rotation axis A4 to a contact point where the cable 263 starts to separate from the cable winding surface 261a. Likewise, an outer cable winding surface 262a of the second cam 262 is eccentrically arranged relative to the pivot axis A1. Thus, the outer cable winding surface 262a of the second cam 262 has a second radial distance X2 that varies around its periphery. The second radial distance X2 is measured from the pivot axis A1 to a contact point where the cable 263 starts to separate from the cable winding surface 262a.

As the first cam 261 rotates in the third direction D3, the second cam 262 rotates in the first direction D1 and the spring tension of the biasing member 238 decreases. During rotation of the first cam 261 in the third direction D3, the outer cable winding surface 261a and the outer cable winding surface 262a are configured such that the first radial distance X1 becomes smaller as the second radial distance X2 becomes larger. Thus, the torque applied to the chain guide 18 becomes larger as the first radial distance X1 becomes smaller and the second radial distance X2 becomes larger.

On the other hand, as the first cam 261 rotates in a fourth direction D4, which is opposite to the third direction D3, the second cam 262 rotates in the second direction D2 and the spring tension of the biasing member 238 increases. During rotation of the first cam 261 in the third direction D4, the outer cable winding surface 261a and the outer cable winding surface 262a are configured such that the first radial distance X1 becomes larger as the second radial distance X2 becomes smaller. Thus, the torque applied to the chain guide 18 becomes smaller as the first radial distance X1 becomes larger and the second radial distance X2 becomes smaller. However, due to the eccentric configurations of the first cam 261 and the second cam 262, the torque applied to the chain guide 18 by the biasing member 238 decreases as the spring tension of the biasing member 238 increases.

Basically, as the distance X1 becomes larger and the distance X2 becomes smaller, the torque applied to the chain guide 18 becomes smaller. Also, as the distance X1 becomes smaller and the distance X2 becomes larger, the torque applied to chain guide 18 becomes larger. Accordingly, when the first radial distance X1 is large and the second radial distance X2 is small, the rotational angle of the first cam 261 becomes smaller and the rotational angle of the second cam 262 becomes larger. As a result, when an effective cam ratio (X2/X1) of the first cam 261 and the second cam 262 becomes small, the torque applied to the pivot shaft 24 about the first axis A1 becomes smaller. Then, the chain tension of the bicycle chain CN generated due to the chain guide 318 becomes smaller. When the chain tension of the bicycle chain CN becomes smaller, the friction between the bicycle chain CN and the drive train DT becomes smaller and drive efficiency becomes better. Therefore, the chain tension becomes reduced by using the torque changing mechanism 260, and reduction of drive efficiency of the drive train DT can thus be suppressed.

While the bicycle derailleur 210 has been described as including the intermediate member 40 and the switching member 42, the intermediate member 40 and the switching member 42 can be omitted from the bicycle derailleur 210 as needed and/or desired. In the case where the intermediate member 40 and the switching member 42 are omitted, the second cam 262 is fixed to or engaged with the chain guide 18. Alternatively, in the case where the intermediate member 40 and the switching member 42 are omitted, the second cam 262 is fixed to or engaged with a part that is fixed to the chain guide 18.

Referring now to FIGS. 32 to 43, a bicycle derailleur 310 is illustrated in accordance with a fourth embodiment. The bicycle derailleur 310 is identical to the bicycle derailleur 10, except that the bicycle derailleur 310 has a modified movable member 314, a modified chain guide 318 and a modified biasing mechanism 336 as explained below. In view of the similarity between the first embodiment and the fourth embodiment, the parts of the fourth embodiment that are identical to the parts of the first embodiment will be given the same reference numerals as the parts of the first embodiment. Moreover, the descriptions of the parts of the fourth embodiment that are identical to the parts of the first embodiment will not be repeated for the sake of brevity.

In the bicycle derailleur 310, the chain guide 318 is pivotally mounted relative to the movable member 314 to pivot about the pivot axis A1. More specifically, the bicycle derailleur 10 further comprises a pivot shaft 324 that is coupled to the movable member 14 and the chain guide 18. Here, the pivot shaft 324 is fixedly coupled to the chain guide 18 and rotatably coupled to the movable member 314. Alternatively, the pivot shaft 324 can be fixedly coupled to movable member 134 and rotatably coupled to the chain guide 318. The pivot shaft 324 defines the pivot axis A1. In this way, the chain guide 318 is pivotally mounted to the movable member 314 by the pivot shaft 324 to pivot about the pivot axis A1. Here, the pivot shaft 324 is fixed to the chain guide 318 by a fixing bolt 326. In this way, the chain guide 318 and the pivot shaft 324 pivot together relative to the movable member 314. Thus, the pivot shaft 324 is pivotally mounted to the movable member 314.

In the bicycle derailleur 310, the biasing mechanism 336 includes a biasing member 338 and an intermediate member 340. Basically, the biasing member 338 is operatively disposed between the movable member 314 and the intermediate member 340. In this way, the biasing member 338 applies a torque to the intermediate member 340 with respect to the movable member 314 to bias the about the pivot axis A1 in the first direction D1 in a biasing state similar to the first embodiment. Preferably, the biasing member 338 is preloaded such that the chain guide 318 in the first direction D1 in a state where the chain CN is disengaged from the chain guide 318 of the bicycle derailleur 310.

Here, the biasing member 338 includes an outer biasing member 338a and an inner biasing member 338b. Here, the biasing member 338 includes an outer biasing member 338a and an inner biasing member 338b. The outer biasing member 338a has an outer coiled torsion spring, and the inner biasing member 338b has an inner coiled torsion spring. The outer biasing member 338a has a coiled portion disposed around a coiled portion of the inner biasing member 338b. The outer biasing member 338a has a first end portion 338a1 that is engaged with the intermediate member 340, and a second end portion 338a2 that is operatively coupled to the movable member 314 via a torque changing mechanism 370, which is discussed below. The inner biasing member 338b has a first end portion 338b1 that is engaged with a connecting member 324a fixed to the pivot shaft 324, and a second end portion 338b2 that is operatively coupled to the movable member 314 via the torque changing mechanism 370. Alternatively, the first end portion 338b1 of the inner biasing member 338b can be connected to the intermediate member 340.

The intermediate member 340 is basically the same as the first embodiment, except that the intermediate member 340 has been modified to be connected between the outer biasing member 338a and the chain guide 318. Since the basic functions and operations of the biasing mechanism 336 (the outer biasing member 338a and the intermediate member 340) are the same as the biasing mechanism 36 of the first embodiment, the descriptions of the functions and operations of the biasing mechanism 36 can be referred to understand the functions and operations of the biasing mechanism 336. However, here, the inner biasing member 338b is not connected to the intermediate member 340 when the biasing mechanism 336 is in a releasing state. Thus, the inner biasing member 338b still applies a torque to the chain guide 318 in the releasing state.

The bicycle derailleur 310 further includes the switching member 42 of the first embodiment. Thus, the switching member 42 is configured to be selectively moved between the disengaging position in which the switching member 42 is not engaged with the intermediate member 340, and the engaging position in which the switching member 42 is engaged with the intermediate member 340. In the engaging position, the switching member 42 is engaged with the intermediate member 340 to establish the releasing state in which the outer biasing member 338a is effectively disengaged from the chain guide 318. Optionally, the intermediate member 340 and the switching member 42 can be omitted, and the outer biasing member 338a can be directly connected to the chain guide 318.

Now, the torque changing mechanism 370 will be discussed in more detail. The torque changing mechanism 370 is operatively disposed between the chain guide 318 and the biasing member 338. The torque changing mechanism 370 is configured to change a torque provided from the biasing member 338 to the chain guide 318 as the chain guide 318 pivots about the pivot axis A1.

Basically, the torque changing mechanism 370 includes a crank member 372, a first link member 374, a second link member 376 and a rocker member 378. The crank member 372 is configured to pivot with the chain guide 318. As the crank member 372 pivot with the chain guide 318, the linkage formed by the crank member 372, the first link member 374, the second link member 376 and the rocker member 378 varies the torque provided from the biasing member 338 to the chain guide 318.

Figure 36:
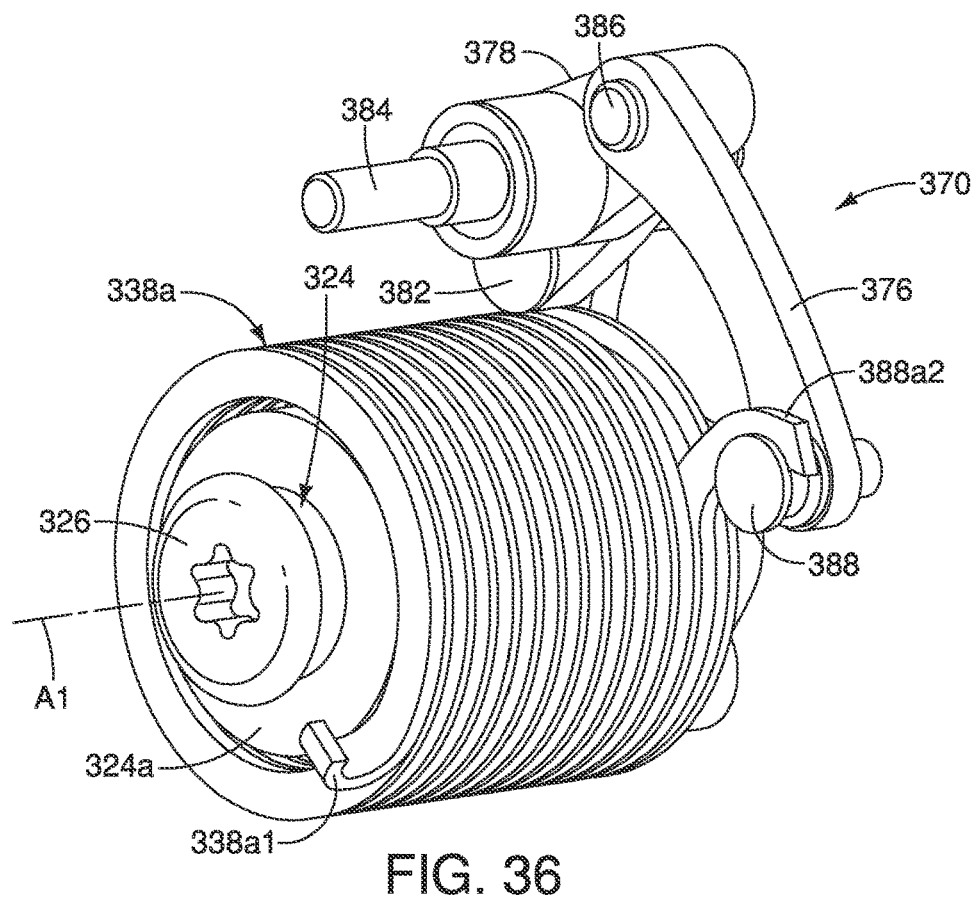
FIG. 36 is a second side perspective view of selected parts of the switching member of the movable member illustrated in FIGS. 32 to 34.
Figure 37:
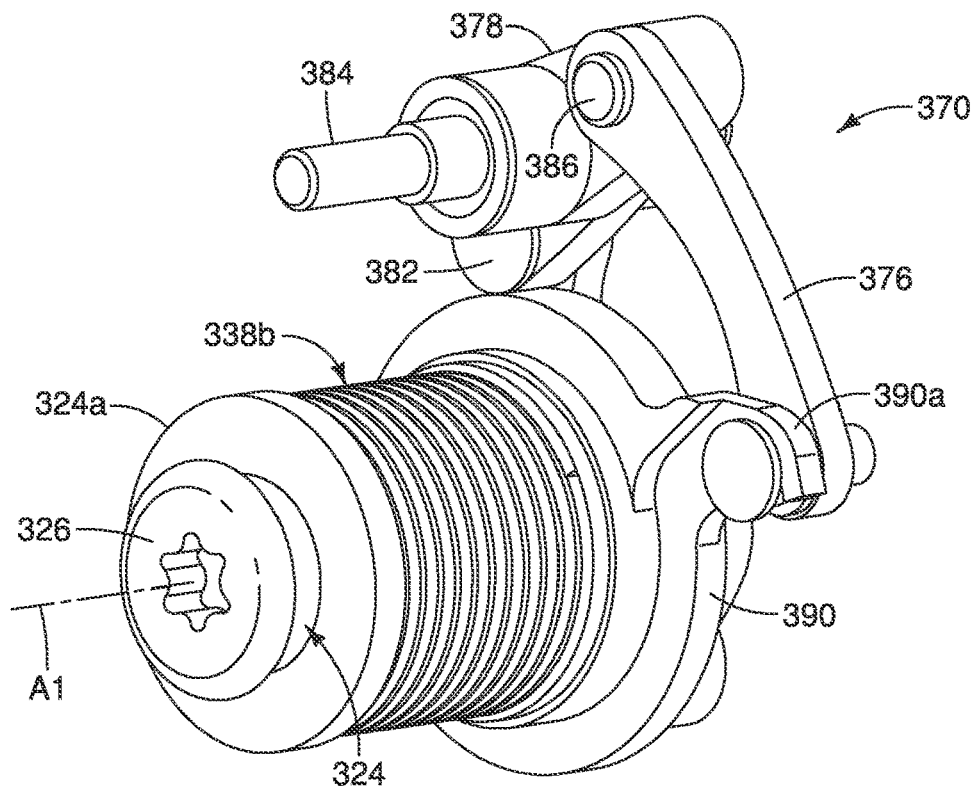
FIG. 37 is another perspective view of selected parts of the switching member of the movable member illustrated in FIGS. 32 to 34.
Figure 38:
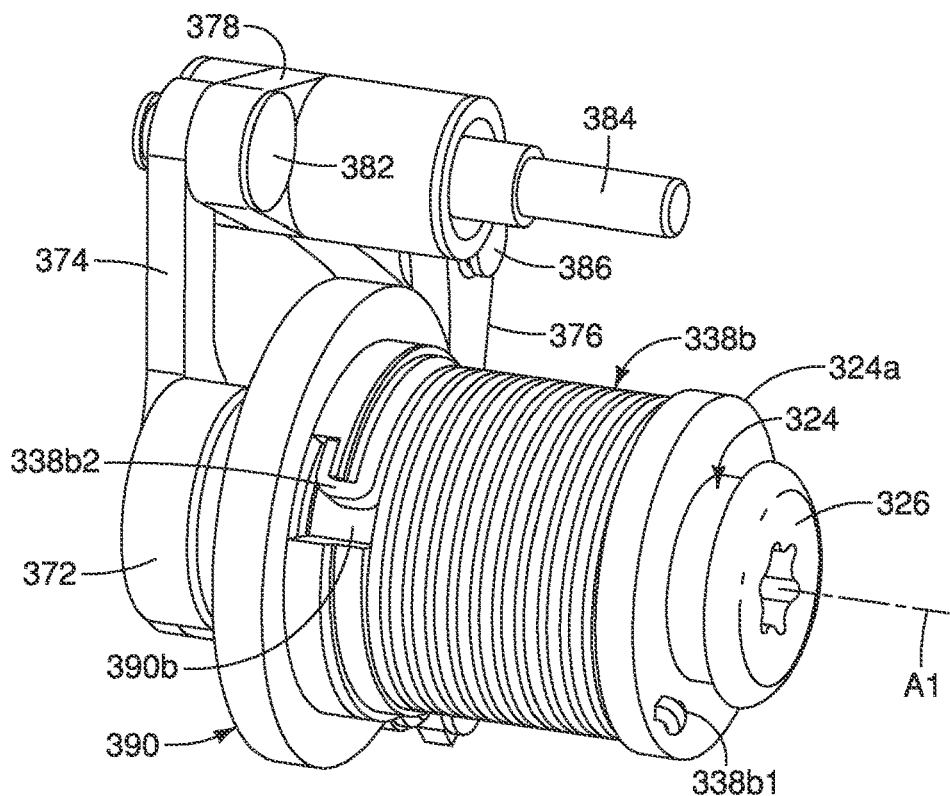
FIG. 38 is another perspective view of selected parts of the switching member of the movable member illustrated in FIGS. 32 to 34.

The crank member 372 is fixed to the pivot shaft 324. Thus, the crank member 372 and the chain guide 318 pivot together about the pivot axis A1. The first link member 374 has a first end that is pivotally connected to the crank member 372 by a first pivot axle 380 such that the first link member 374 is moved in response to movement of the crank member 372 about the pivot axis A1. Here, the first pivot axle 380 is disposed in an elongated guide opening 374a of the first link member 374 such that the first link member 374 slide on the first pivot axle 380 in order to provide enough stroke during movement of the crank member 372. The first link member 374 has a second end that is pivotally connected to a first end of the rocker member 378 by a second pivot axle 382. The rocker member 378 is pivotally mounted to the movable member 314 by a third pivot axle 384 that defines a pivot axis parallel to the pivot axis A1. The rocker member 378 is rocked on the third pivot axle 384 in response to movement of the crank member 372 about the pivot axis A1. The second link member 376 has a first end pivotally connected to a second end of the rocker member 378 by a fourth pivot axle 386 such that the second link member 376 moves in response to the rocking movement of the rocker member 378 on the third pivot axle 384. The second link member 376 has a second end that is provided with a connecting pin 388. The connecting pin 388 is engaged with the second end portion 338a2 of the outer biasing member 338a as seen in FIG. 36. Thus, movement of the second link member 376 will either increase or decrease the amount of spring twist of the outer biasing member 338a. The connecting pin 388 is also engaged with a connecting member 390 that is pivotally provide on the pivot shaft 324 as seen in FIG. 36. In particular, the connecting member 390 has a hook 390a that is engaged with the connecting member 390. The second end portion 338b2 of the inner biasing member 338b is engaged with a notch 390b of the connecting member 390. Thus, movement of the second link member 376 will also either increase or decrease the amount of spring twist of the inner biasing member 338b.

Figure 39:
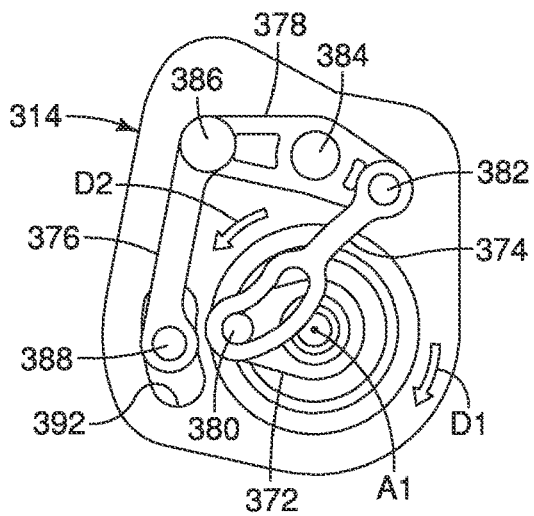
FIG. 39 is a diagrammatic illustration of the switching member of the movable member illustrated in FIGS. 32 to 34 in a first position.
Figure 40:
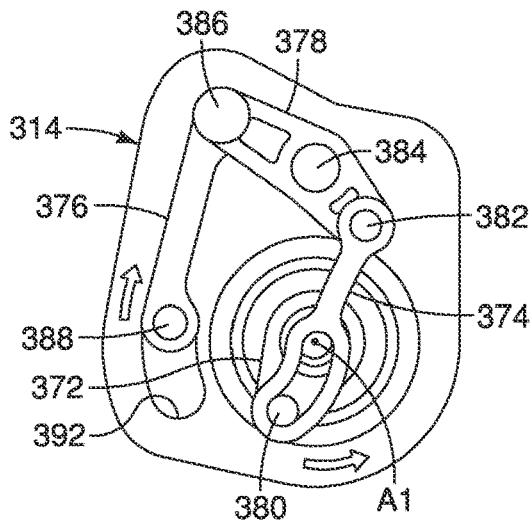
FIG. 40 is a diagrammatic illustration of the switching member of the movable member illustrated in FIGS. 32 to 34 in a second position.
Figure 41:
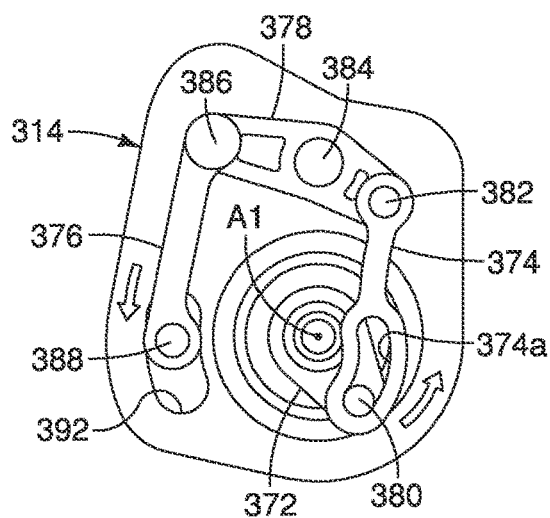
FIG. 41 is a diagrammatic illustration of the switching member of the movable member illustrated in FIGS. 32 to 34 in a third position.
Figure 42:
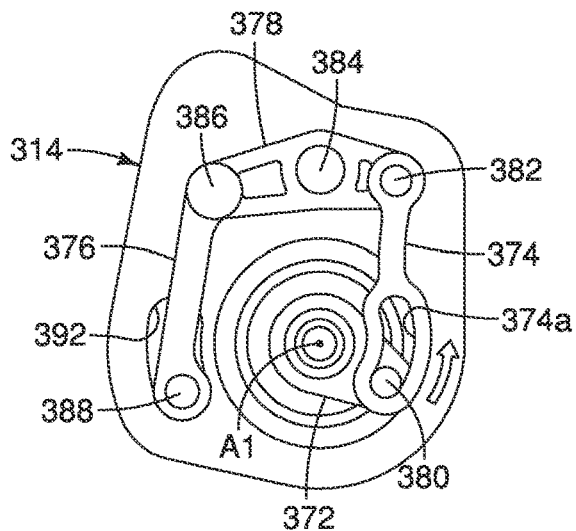
FIG. 42 is a diagrammatic illustration of the switching member of the movable member illustrated in FIGS. 32 to 34 in a fourth position.
Figure 43:
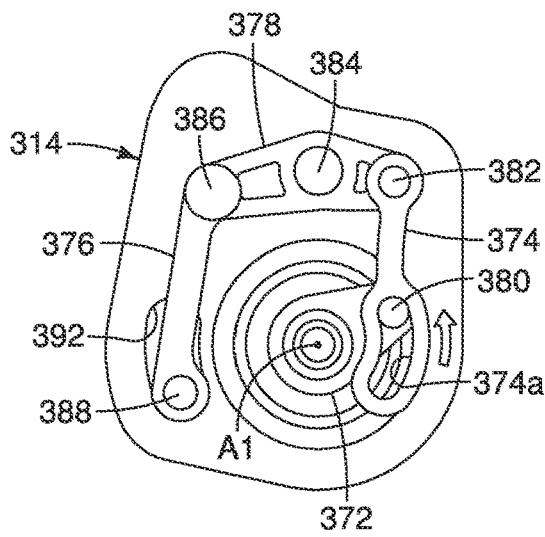
FIG. 43 is a diagrammatic illustration of the switching member of the movable member illustrated in FIGS. 32 to 34 in a fifth position.

Referring to FIGS. 39 to 43, the movements of the torque changing mechanism 370 are illustrated where the chain guide 318 is moved in the second direction D2 from a top towards a low position. As mentioned above, the crank member 372 is configured to pivot with the chain guide 318. As seen in FIGS. 39 and 40, as the crank member 372 pivots in the second direction D2 from the top position of FIG. 39 to the position of FIG. 40, the connecting pin 388 pivots in the opposite direction with respect to the pivotal movement of the chain guide 318 and the crank member 372. As a result, the amount of spring twist per unit movement angle is reduced. As seen in FIGS. 41 and 42, after spring force reaches a desired spring force, the connecting pin 388 beings to pivot in same direction with respect to the pivotal movement of the chain guide 318 and the crank member 372. As seen in FIG. 43, after the connecting pin 388 contacts an edge of a guide hole 392 in the movable member 314, the first pivot axle 380 moves along the elongated guide opening 374a of the first link member 374.

While the bicycle derailleur 310 has been described as including the intermediate member 340 and the switching member 342, the intermediate member 340 and the switching member 342 can be omitted from the bicycle derailleur 310 as needed and/or desired. In the case where the intermediate member 340 and the switching member 342 are omitted, the end portion of the outer biasing member 338a is fixed to or engaged with the chain guide 318. Alternatively, in the case where the intermediate member 340 and the switching member 342 are omitted, the end portion of the outer biasing member 338a is fixed to or engaged with a part that is fixed to the chain guide 318.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle derailleur. Accordingly, these directional terms, as utilized to describe the bicycle derailleur should be interpreted relative to a bicycle in an upright riding position on a horizontal surface and that is equipped with the bicycle derailleur. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
a base member;
a movable member;
a link member movably coupling the movable member to the base member;
a chain guide pivotally coupled to the movable member about a pivot axis, the chain guide including a guide pulley having a first rotational axis that is spaced from the pivot axis of the chain guide and a tension pulley having a second rotational axis that is spaced farther from the pivot axis than the first rotational axis is spaced from the pivot axis;
a biasing mechanism operatively disposed between the movable member and the chain guide, the biasing mechanism biasing the chain guide with respect to the movable member about the pivot axis in a first direction in a biasing state; and a switching member configured to selectively switch the biasing mechanism between the biasing state and a releasing state, the switching member including a pin movably coupled to the movable member along a center axis of the pin, the center axis of the pin being disposed radially inward of the first rotational axis of the guide pulley in a radial direction of the pivot axis of the chain guide, the switching member being engaged with the biasing mechanism to prevent the biasing mechanism from biasing the chain guide in the releasing state, and the switching member being disengaged from the biasing mechanism to permit the biasing member to bias the chain guide in the biasing state.

2. The bicycle derailleur according to claim 1, wherein the switching member is movably coupled to the movable member between an engaging position to establish the releasing state and a disengaging position to establish the biasing state.

3. The bicycle derailleur according to claim 2, wherein the switching member is biased towards the disengaging position.

4. The bicycle derailleur according to claim 1, wherein the switching member includes a biasing element biasing the pin towards the disengaging position.

5. The bicycle derailleur according to claim 1, wherein the center axis of the pin is parallel to the pivot axis of the chain guide.

6. The bicycle derailleur according to claim 1, wherein the pin is movably disposed in an axial direction of a through hole of the movable member.

7. The bicycle derailleur according to claim 1, wherein the biasing mechanism includes a biasing member and an intermediate member, the biasing member transmits a torque to the intermediate member, and the intermediate member is configured to transmit the torque of the biasing member to the chain guide in the biasing state.

8. The bicycle derailleur according to claim 7, wherein the intermediate member is located between the movable member and the chain guide.

9. The bicycle derailleur according to claim 7, wherein the intermediate member is configured to move with respect to the movable member between a first position and a second position, the switching member is configured to be engaged with the intermediate member at the second position.

10. The bicycle derailleur according to claim 9, wherein the second position of the intermediate member is located upstream of the first position of the intermediate member with respect to the first direction.

11. The bicycle derailleur according to claim 9, wherein the intermediate member is configured to be moved against the torque of the biasing member to the second position by moving the chain guide in a second direction opposite to the first direction.

12. The bicycle derailleur according to claim 7, wherein the intermediate member is pivotally disposed around the pivot axis of the chain guide.

13. The bicycle derailleur according to claim 7, wherein the intermediate member includes a biasing portion and a first engaging portion, the biasing portion is configured to contact the chain guide to bias the chain guide in the first direction, and the first engaging portion is configured to engage with the switching member in a state where the biasing member is in the releasing state.

14. The bicycle derailleur according to claim 13, wherein the first engaging portion is offset from the biasing portion with respect to an axial direction of the pivot axis of the chain guide.

15. The bicycle derailleur according to claim 13, wherein the switching member includes a second engaging portion that is engaged with the first engaging portion in a state where the biasing mechanism is in the releasing state.

16. The bicycle derailleur according to claim 7, wherein the chain guide is free from the torque of the biasing member in the releasing state.

17. A bicycle derailleur comprising:

a base member;

a movable member;

a link member movably coupling the movable member to the base member;

a chain guide pivotally coupled to the movable member about a pivot axis;

a biasing member operatively disposed between the movable member and the chain guide, and biasing the chain guide with respect to the movable member about the pivot axis in a first direction in a biasing state;

an intermediate member movably coupled to the movable member, the intermediate member including a biasing portion and a first engaging portion, the biasing portion contacting the chain guide to transmit a torque of the biasing member to the chain guide in the biasing state, the biasing portion and the first engaging portion being integrally formed with the intermediate member as a one-piece member, and a switching member movably coupled to the movable member between an engaging position and a disengaging position, the switching member including a second engaging portion engaged with the first engaging portion of the intermediate member to prevent the torque of the biasing member to be transmitted to the chain guide in the engaging position, and the second engaging portion being disengaged from the first engaging portion of the intermediate member in the disengaging position to permit the torque of the biasing member to be transmitted to the chain guide in the disengaging position, the intermediate member being pivotally disposed around the pivot axis relative to the switching member.

* * * * *